(12) United States Patent
Kawasaki

(10) Patent No.: US 6,843,904 B1
(45) Date of Patent: Jan. 18, 2005

(54) INSPECTION AND REPAIR OF ACTIVE TYPE SUBSTRATE

(75) Inventor: Kiyohiro Kawasaki, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 247 days.

(21) Appl. No.: 09/868,577
(22) PCT Filed: Oct. 18, 2000
(86) PCT No.: PCT/JP00/07250
§ 371 (c)(1), (2), (4) Date: Jun. 20, 2001
(87) PCT Pub. No.: WO01/29807
PCT Pub. Date: Apr. 26, 2001

(30) Foreign Application Priority Data

Oct. 21, 1999 (JP) ........................................ H11-299655
Apr. 10, 2000 (JP) ....................................... 2000-107577

(51) Int. Cl.⁷ ........................ G01N 27/00; G01N 27/416
(52) U.S. Cl. ................................ 205/791.5; 205/790.5; 204/229.8
(58) Field of Search ............................. 204/198, 232, 204/237, 242, 275.1, 297.01, 297.06, 297.14, 224 R, 224 M, 229.8; 205/118, 122, 125, 775, 790.5, 791.5

(56) References Cited

U.S. PATENT DOCUMENTS

| | | | | |
|---|---|---|---|---|
| 3,637,468 A | * | 1/1972 | Icxi et al. ................. | 205/118 |
| 4,473,795 A | * | 9/1984 | Wood ........................ | 324/501 |
| 5,284,554 A | * | 2/1994 | Datta et al. ............... | 205/653 |
| 5,368,711 A | * | 11/1994 | Poris ........................ | 204/193 |
| 5,665,496 A | | 9/1997 | Omika et al. .............. | 430/7 |
| 5,776,330 A | * | 7/1998 | D'Muhala .................. | 205/687 |
| 5,877,083 A | | 3/1999 | Yamazaki .................. | 438/635 |
| 6,017,437 A | * | 1/2000 | Ting et al. ................. | 205/80 |
| 6,103,096 A | * | 8/2000 | Datta et al. ............... | 205/686 |
| 6,176,992 B1 | * | 1/2001 | Talieh ....................... | 205/87 |
| 6,328,872 B1 | * | 12/2001 | Talieh et al. .............. | 205/206 |
| 6,334,937 B1 | * | 1/2002 | Batz et al. ................. | 204/212 |

FOREIGN PATENT DOCUMENTS

| | | |
|---|---|---|
| JP | 04-219790 | 8/1992 |
| JP | 06-160903 | 6/1994 |
| JP | 06-331582 | 12/1994 |
| JP | 07-294957 | 11/1995 |
| JP | 08-006072 | 1/1996 |
| JP | 08-261873 | 10/1996 |
| JP | 09-113935 | 5/1997 |
| JP | 64-083162 | 3/1999 |
| JP | 11-218785 | 8/1999 |
| JP | 11-271752 | 10/1999 |

* cited by examiner

Primary Examiner—Nam Nguyen
Assistant Examiner—Brian L. Mutschler
(74) Attorney, Agent, or Firm—Parkhurst & Wendel, L.L.P.

(57) ABSTRACT

An in-substrate selective electrochemical treatment system for finding and repairing pinholes of an active substrate including holding an insulating substrate having a conductive pattern, supplying a predetermined amount of a specified chemical solution to a specified region on the insulating substrate and confining it in the specified region, locating the reversed polarity electrode plate close to the insulating substrate such that the reversed polarity electrode plate comes in contact with the chemical solution on the upper surface of the insulating substrate, bringing the electrode into contact with the conductive pattern in the periphery of the insulating substrate, applying a specified direct current between the electrode and the reversed polarity electrode plate, and measuring a value of current flowing between the electrode and the reversed polarity electrode plate.

11 Claims, 17 Drawing Sheets

Fig. 13
(1)
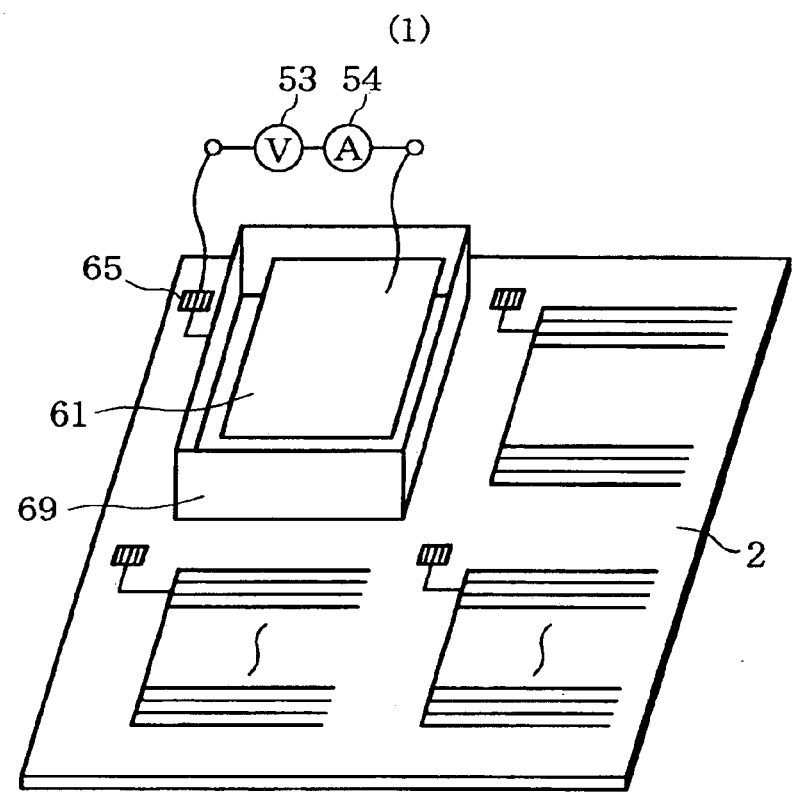
(2)
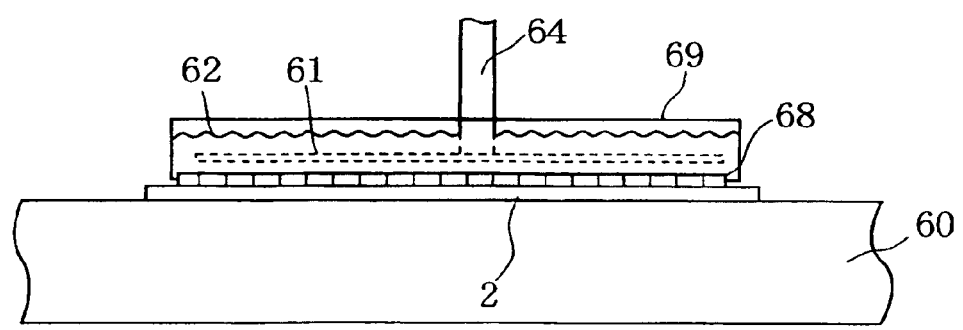

Fig. 14
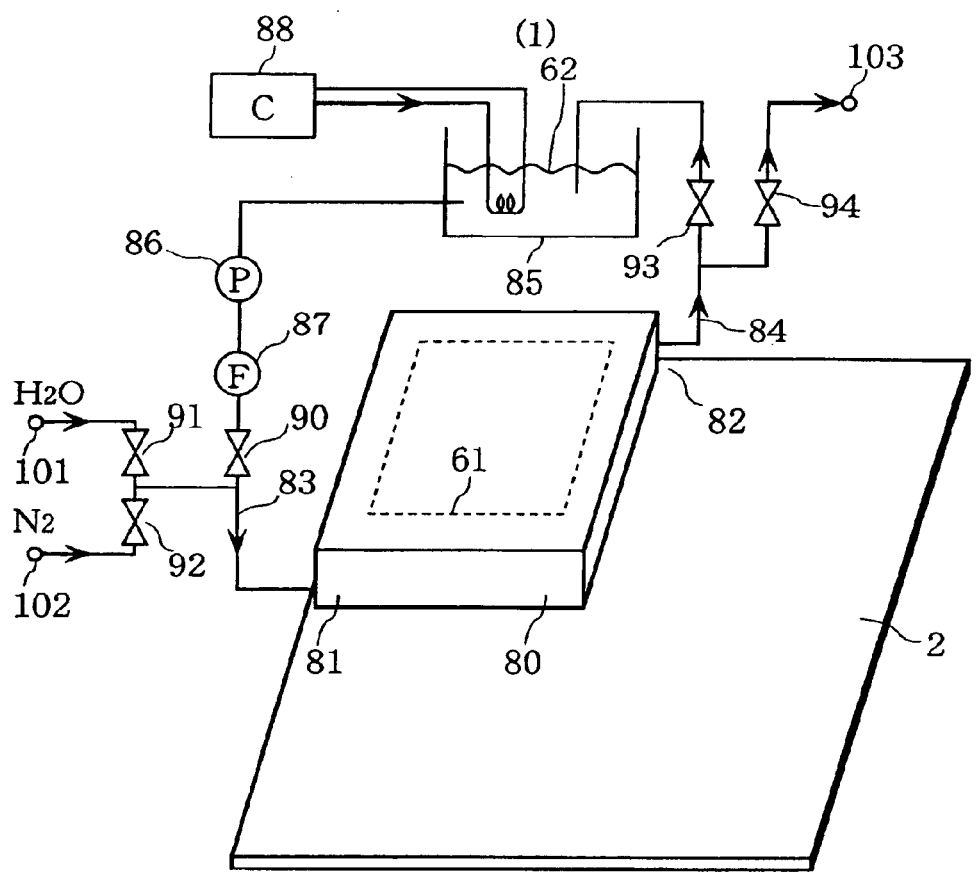
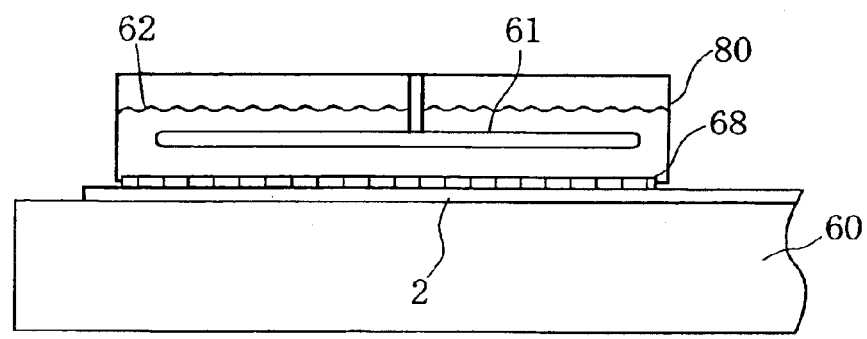

Fig. 15
(1)
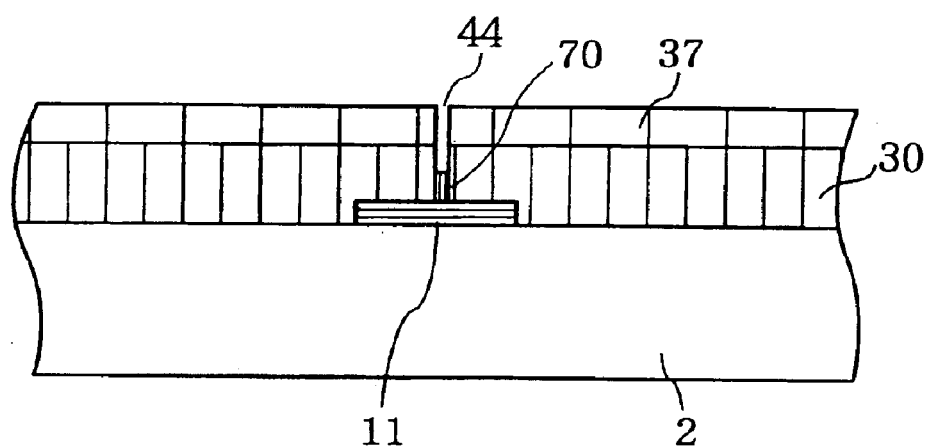
(2)
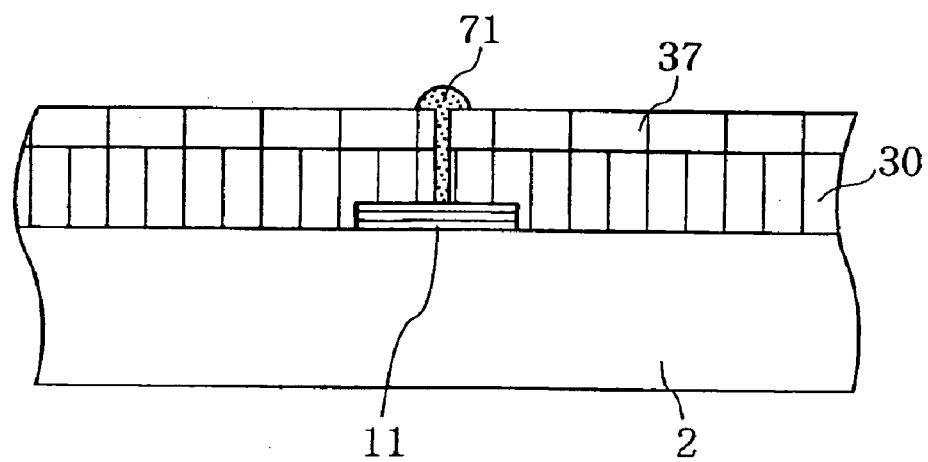

INSPECTION AND REPAIR OF ACTIVE TYPE SUBSTRATE

TECHNICAL FIELD

The present invention relates to devices using a liquid crystal and particularly to techniques for aging tests, pinhole inspection and repair of active type liquid crystal devices.

BACKGROUND ART (General Background Art)

Thanks to recent developments in miniaturization, liquid in crystal materials, high density packaging techniques and others, various types of image display devices (e.g., televisions that employ a liquid crystal panel having a diagonal line length of 5 to 50 cm) are Ad presently manufactured and marketed on a large scale. Further, color displaying is easily enabled by forming red, green and blue colored layers on either one of two glass substrates that constitute a liquid crystal panel. This tendency is noticeable particularly in the so-called active type liquid crystal panels having a switching element for every pixel, because they have less crosstalk and capability of displaying high contrast images at high response speed.

While the matrix structures of image display devices (liquid crystal panels), which employ such liquid crystals, generally include 200 to 1,200 scan lines and about 200 to 1,600 signals lines, techniques for achieving larger screens and higher refinement (i.e., higher pixel densities and higher gray scales) concurrently progress in order to meet demands toward higher displaying quality.

FIG. 1 shows the condition of each part mounted in a liquid crystal panel. As shown in FIG. 1, specified electric signals or picture signals are provided for an image displaying section by the COG (Chip-On-Glass) process or the TCP (Tape-Carrier-Package) process. The COG process is used for, for example, connection of a semiconductor integrated circuit chip 3 by use of a conductive adhesive, the semiconductor integrated circuit chip 3 supplying a drive signal to the electrode terminals 6 of scan lines formed on one of transparent insulating substrates (i.e., glass substrates) 2 that constitutes a liquid crystal panel 1. In the TCP process, for example, a TCP film 4, which is comprised of a thin polyimide type resin film serving as a base and a terminal made of a gold-plated or soldered copper foil (not shown), is pressed against and fixed to the terminals 5 of signal lines, using an appropriate adhesive containing a conductive medium.

While two types of mounting techniques are shown in FIG. 1 for the sake of extensive disclosure of the prior art techniques, it is apparent that either one of them is selected for use in the actual production of display devices.

Reference numerals 7, 8 are wiring lines for connecting the image displaying section positioned at substantially the center of the liquid crystal panel 1 and the electrode terminals 5, 6 of signal lines and scan lines. Reference numeral 9 designates another opposed-glass substrate that serves as a transparent insulating substrate having, on an opposed surface, a transparent conductive opposed electrode common to all liquid crystal cells.

They are not necessarily formed from the same conductive material as that of the electrode terminals 5, 6

FIG. 2 shows an equivalent circuit diagram of an active type liquid crystal panel in which an insulated gate transistor 10 is disposed for every pixel as a switching element. In FIG. 2, reference numerals 8, 7 designate a scan line and a signal line, respectively. Reference numeral 13 designates a liquid crystal cell which is electrically treated as a capacitive element. In this figure, the elements and signal lines depicted by solid line are formed on one (i.e., the substrate on the array side) 2 of the glass substrates which constitute the liquid crystal panel 1 whereas opposed electrodes 14 common to all liquid crystal cells and depicted by dotted line are formed on the other glass substrate (i.e., the opposed substrate) 9.

For the OFF resistance of the insulated gate transistor 10, or where the resistance of the liquid crystal cell is low, or where importance is attached to the gray scale of displayed images, some devices are made to the circuit. For instance, an auxiliary storage capacitor 15 is added in parallel with each liquid crystal cell 13 in order to increase the time constant of the liquid crystal cell as a load. Note that reference numeral 16 in FIG. 2 is a common bus for the storage capacitors.

FIG. 3 shows a cross section of a fundamental part of a pixel section of a liquid crystal panel. As shown in this figure, the two glass substrates 2, 9, which constitute the liquid crystal panel, are formed so as to be spaced a specified distance (about several μm) apart by use of spacer materials (not shown) such as resin fibers or beads. The gap between them forms a closed space sealed in the periphery of the glass substrate 9 by a sealer made of an organic resin and an end-sealing material (both are not shown). This closed space is filled with a liquid crystal 17 by the vacuum filling method or the like.

For color displaying, an organic thin film, which has a thickness of about 1 to 2 lm and contains either or both of a die and a pigment called a color filter 18, is adhered to the closed space side (i.e., liquid crystal layer side) of the glass substrate 9. In the case of red color displaying for instance, the liquid crystal layer of a red color filter section through which only red light can pass is lit alone, allowing permeation of back light incoming from its rear face. For this arrangement, color filters of red (R), green (G) and blue (B) are arranged in the pattern of mosaic, delta etc. in actual liquid crystal image display devices.

The above-described techniques are already known and therefore a further description of them will be omitted. The glass plate 9 is also called "color filter substrate (CF)". Depending on the characteristics of the liquid crystal material 17, a polarizing plate 19 is applied to either or both of the upper surface of the glass substrate 9 and the lower surface of the glass substrate 2 so that the liquid crystal panel 1 functions as an electric optical element. Most of currently commercially available liquid crystal panels use TN (Twisted. Nematic) type liquid crystal material and generally require two polarizing plates 19.

Although not shown in the drawings, the permeation type liquid crystal image display device shown in the above figures is exposed to white light projected from a back face light source installed under the liquid crystal image display device. In a reflective type liquid crystal image display device, a reflecting mirror is formed on an array substrate (as a general rule) positioned on the lower side (opposite to the user's side) of the device, a transparent conductive film is formed on the upper side (i.e., the user's side (liquid crystal layer side)) of the reflecting mirror, and a TFT and signals lines are further formed on the conductive film. There are other types of devices such as guest host mode color image displays and multi-layered substrate type image displays.

Reference numeral 20 designates an alignment layer for orienting liquid crystal molecules in a specified direction. The alignment layer is formed on the respective liquid crystal sides of the two glass substrates 2, 9, using a polyimide type resin thin film having a thickness of about 0.1 μm. Reference numeral 21 designates a drain electrode (wiring) for connecting the drain of the insulated gate transistor 10 to a transparent conductive pixel electrode 22. The drain electrode 21 is often formed at the same time with the formation of a signal line (source line) 12. Reference numeral 23 designates a semiconductor layer positioned between the signal line 12 and the drain electrode 21 and will be later described in detail.

Reference numeral 24 is a Cr thin film layer having a thickness of about 0.1 μm and defined by the boundary of a colored layer 18 which abuts on the Cr thin film layer on a color filter 9. The Cr thin film layer 24 functions to prevent external light from coming into the semiconductor layer, the scan lines 11 and the signal line 12, thereby improving color displaying characteristics. Therefore, the Cr thin film layer is generally called "Black Matrix (BM)".

Next, there will be explained the structure and fabricating process of the insulated gate transistor used as a switching element. Two types of insulated gate transistors have been widely used up to now. One of them is called "etch stop type transistor" which will be described below. FIG. 4 shows a plan view of a unit pixel of an active matrix substrate constituting a conventional liquid crystal panel when it is in a finished condition, whereas FIG. 5 shows transition occurring in the section taken along line A—A as the fabrication process proceeds. Referring mainly to FIG. 5, the fabricating process will be briefly described. A region 48 (the region hatched by rightwardly inclined diagonal lines in FIG. 4), in which a projection 50 formed by the scan lines 11 and the pixel electrode 22 are overlapped with each other with a gate insulating layer between, forms the aforesaid storage capacitor 15, but a detailed description of it is omitted herein.

Now, reference is made to FIG. 5.

(1) As an insulating substrate having high heat resistance, chemical resistance and transparency, a 0.5 to 1.1 mm-thick glass substrate 2 (e.g., "product 1737" produced by Corning Co., Ltd.) is used. Cr, Ta, Mo or the like or an alloy of these metals is applied to one surface of the glass substrate 2 by use of a vacuum film formation system such as SPT (sputtering system), thereby forming a first metal layer having a thickness of about 0.1 to 0.3 μm. Then, a gate electrode 11 also serving as a scan line is "selectively" formed (i.e., formed on only a predetermined position) on one surface of the glass substrate 2 by the elaborative processing technique such as photolithography.

It is preferable to use aluminum (AL) as the material of the scan lines in order to reduce the resistance value of the scan lines for coping with the trend toward larger screens for liquid crystal panels. Since AL is low in heat resistance, AL is used by laminating it with one of the above-mentioned heat-resistant metals Cr, Ta, Mo and their silicides, or alternatively by forming an anodized layer ($AL_2O_3$) on the surface of AL by anodic oxidation. In short, the scan lines 11 are generally comprised of a plurality of metal layers or the like.

(2) Three kinds of thin film layers, which are (i) a first SiNx (silicon nitride) layer 30 serving as a gate insulating layer, (ii) a first amorphous silicon (a-Si) layer 31 which contains virtually no impurities and serves as a channel for an insulated gate transistor, and (iii) a second SiNx layer 32, are sequentially formed on the entire surface of the glass substrate 2 so as to have thicknesses of about 0.3 μm, 0.05 μm, and 0.1 μm respectively, using a PCVD (Plasma•CVD) system.

Apart from the above, the following yield improvement measures are often taken when the gate insulating layer is formed:

(i) Lamination with other types of insulating layers (e.g., TaOx, $SiO_2$ and $Al_2O_3$ mentioned above); and (ii) The two SiNY layers are separately formed and a washing process is carried out in the course of the film formation. It should be noted that the gate insulating layer is not limited to one kind of layer or a single layer. Multi-crystallization (i.e., making polysilicons) by laser-annealing amorphous silicon may be employed. These techniques are already known, and therefore an explanation on them is omitted herein.

(3) By use of the elaborative processing technique, the second SiNx layer on the gate 11 is "selectively" left (left on a specified position) so as to have width narrower than the gate 11, so that a first amorphous silicon layer 310 is exposed in the form of a so-called island 320. Likewise, a second amorphous silicon 330 containing, for example, phosphorus as an impurity and having a thickness of about e.g., 0.05 μm is applied to the entire surface, using the PCVD system.

The gate insulating layer 30 is exposed, with the islands 310, 320 of the first and second amorphous silicon layers being left only in the vicinity of the gate 11.

(4) An ITO (Indium-Tin-Oxide) for example is applied as a transparent conductive layer having a thickness of about 0.1 to 0.2 μm, using a vacuum film formation system such as SPT (sputtering system), and the pixel electrode 22 is formed by the elaborative processing technique.

Although not shown in the drawings, selective formation of an opening necessary for electric connection to the scan lines 11 is carried out, the opening leading to the gate insulating layer 30 formed on the scan lines in the periphery of the image displaying section.

(5) By use of a vacuum film formation system such as SPT, a heat-resistant metallic thin film layer made from e.g., Ti, Cr or Mo is formed as a heat-resistant metal layer having a thickness of about 0.1 μm and, subsequently, an AL thin film layer having a thickness of about 0.3 μm is formed as a low-resistant wiring layer. Then, the drain electrode 21 of the insulated gate transistor composed of a lamination of a heat-resistant metal layer 340 and a low-resistant wiring layer 350 and the source electrode 12 serving as a signal line as well are selectively formed by the elaborative processing technique. By use of a photosensitive resin pattern used in the selective pattern formation as a mask, the amorphous silicon layer 330 on the second SiNx layer 320 between the source and drain electrodes is removed to expose the second SiNx layer 320, while the first amorphous silicon layer 310 in other areas is removed to expose the gate insulating layer 30.

The source electrode 12 and the drain electrode 21 are formed in such a positional relationship that they are partly overlapped with the gate 11 in a plane, so that the insulated gate transistor does not have an offset structure. There are other common designs. For example, an opening is formed on the scan lines 11 in the periphery of the image displaying section and the terminal electrode 6 on the side of the scan lines is formed simultaneously with the signal line 12, or a wire line 8 for connecting the scan lines 11 to the terminal electrode 6 on the scan line side is formed.

Lastly, like the formation of the gate insulating layer 30, a 0.3 to 0.7 μm-thick SiNx layer is applied to the entire surface of the glass substrate 2 as a transparent insulating layer, using the PCVD system, so that a passivation insulating layer is formed.

(6) An opening 38 is formed on the pixel electrode 22 to expose most part of the pixel electrode 22, while an opening (not shown) is formed on the terminal electrodes 5, 6 in the periphery thereby to expose most part of the terminal electrodes 5, 6. Thus, formation of the active substrate 2 is completed.

If the resistance of the signal line 12 does not cause a problem for such a reason that the size of the display panel is small, the low-resistant wiring layer made of AL is not always necessary and a heat-resistant metal material such as Cr, Ta or Mo is used, so that the source wiring 12 and the drain wiring 21 can be formed into a single layer.

The details of the heat resistance of insulated gate transistors are described in the previous example, Japanese Patent Publication Gazette No. 7-74368 (1995). Apart from the above, there are other steps such as filling of impurities, but this is a known technique and therefore its explanation will be omitted.

The passivation insulating layer 37 on the pixel electrode 22 is removed for the following reasons: firstly, the effective voltage applied to the liquid crystal cell is prevented from dropping. Secondly, since the quality of the passivation insulating layer is usually extremely poor, such an unfavorable situation must be avoided that electric charges are accumulated within the passivation insulating layer resulting in the persistence of displayed images. This is due to the fact that the heat resistance of the insulated gate transistor is not satisfactorily high and therefore the temperature of F=the formation of the passivation insulating layer is inevitably 250° C. or lower which is several (abt. 5, 6) tens of degrees centigrade lower than that of the gate insulating layer.

Next, there will be explained liquid crystal panels of Parallel Electric Field Mode or IPS (In-Plane Switching) Mode which are recently extensively commercialized because of their capability of displaying with wide viewing angles. FIG. 6 shows a cross section of a fundamental part of the image displaying section of an IPS mode liquid crystal panel. This IPS mode liquid crystal panel differs from the conventional prevailing liquid crystal panel shown in FIG. 3 in that the liquid crystal cell is composed of opposed conductive electrodes 40 and a pixel electrode 41(21) which are spaced a specified distance apart and a liquid crystal 17, and that the liquid crystal 17 is switched (operated) by the parallel-oriented electric field generated between the opposed electrodes 40 and the pixel electrode 41. Therefore, in the IPS mode liquid crystal panel, there is no need to provide a transparent conductive opposed electrode on the color filter substrate and to provide a transparent conductive pixel electrode on the active substrate. This leads to a reduction in the number of steps for fabricating the active substrate.

FIG. 7 shows a plan view of a unit pixel of the active substrate of the IPS mode liquid crystal panel. FIG. 8 shows transition in the cross section taken along line A—A of FIG. 7, which occurs with the progress of the fabrication process. Referring mainly to FIG. 8, the fabrication process of an IPS mode liquid crystal panel will be hereinafter briefly described, taking a case, in which a channel etch type insulated gate transistor is employed, for example. In FIG. 7, the region. 49 (doubled hatched region), in which the opposed electrodes (common capacitance lines) 40 and the pixel electrode 41(21) are partially overlapped with each other, with the gate insulating layer between, forms a storage capacitor 15, but this will not be explained in detail herein.

Reference is now made to FIG. 8.

(1) A first metal layer having a thickness of about 0.1 to 0.3 μm is applied to one surface of the glass plate 2, using a vacuum film formation system such as SPT (sputtering system) and the gate electrode 11 which also function as scan lines and the opposed electrodes 40 are selectively formed by the elaborative processing technique.

(2) Three kinds of thin film layers, which are (i) the first SiNx layer 30 serving as a gate insulating layer, (ii) the first amorphous silicon layer 31 which contains virtually no impurities and serves as a channel for the insulated gate transistor, and (iii) the second amorphous layer 33 which contains impurities and serves as a source and drain for the insulated gate transistor, are sequentially formed on the entire surface of the glass substrate 2 so as to have thicknesses of about 0.3 μm, 0.2 μm, and 0.05)μm respectively, using the PCVD (Plasma CVD) system.

(3) The gate insulating layer 30 is exposed, with first and second semiconductor layers made of amorphous silicon left as islands 310, 330 on the gate 11. Although not shown in the drawings, selective formation of an opening is done, the opening leading to the gate insulating layer 30 on the scan lines around the image displaying section. This opening is required for electric connection to the scan lines 11.

(4) By use of a vacuum film formation system such as SPT, a Ti thin film layer for instance is formed as a heat-resistant metal layer having a thickness of about 0.1 μm and, subsequently, an AL thin film layer having a thickness of about 0.3 μm is formed as a low-resistant wiring layer. Then, the drain electrode 21 and source electrode 12 for the insulated gate transistor are selectively formed, using the elaborative processing technique, the drain electrode 21 serving as the pixel electrode 41 as well while the source electrode 12 serves as a signal line as well. This selective pattern formation is called "channel etch" because the AL thin film layer 350, the Ti thin film layer 340 and the second amorphous silicon layer 330 are sequentially etched, using, as a mask, a photosensitive resin pattern 43 used in the formation of the source and drain wiring and the first amorphous silicon layer 310 is etched with a part (0.05 to 0.1 μm in height) being left.

(5) After the photosensitive resin pattern 43 has been removed, a 0.3 μm-thick SiNx layer is applied to the entire surface of the glass substrate 2 as a transparent insulating layer using the PCVD system similarly to the formation of the gate insulating layer, whereby a passivation insulating layer 37 is formed. Although not shown in the drawings, an opening is formed on the terminal electrodes around the periphery of the substrate to expose most part of the terminal electrodes 5, 6. Thus, the formation of the active substrate is completed.

It is apparent from the above description that since the opposed electrodes 40 are formed simultaneously with the formation of the scan lines 11 while the pixel electrode 41 is formed simultaneously with the formation of the source and drain wires 12, 21, the transparent conductive layer 22 serving as the pixel electrode is unnecessary and as a result, the number of fabricating steps can be reduced, compared to the fabrication process described earlier.

It is necessary for channel etch type insulated gate transistors in view of the uniformity of the film formation process and the etching process to make the first amorphous silicon layer including no impurities thicker than those of etch stop type transistors. Regarding the operation of the PCVD system and particle generation, the channel etch type has a problem in production capability. In addition, it has a problem in performance index since the mobility of electrons is small. These subjects will not be further discussed herein.

(Background art in view of the problems that the invention is to solve)

As understood from the foregoing description, the fabrication of active type liquid crystal image displays is quite complicated and requires high precision. Therefore, defects inevitably occur in various modes. To solve this problem, various inspections, estimations and tests are made in accordance with the quality standard at the time of shipment from plants. As a result, defect modes such as checked and dealt with in the various inspections are rarely found by the end users or consumers and rarely cause damage nor troubles to them. However, some defect modes occur after long-run jobs or long use, although it is always the case with other products. To cope with such defect modes, absence of defects must be confirmed by making an aging inspection in which products undergo a so-called accelerated test environment such as a highly heated condition. This aging inspection is not so expensive when conducted on a certain production lot, but incurs tremendous cost when all products are tested for more than several hours.

A typical defect mode which requires the above aging inspection will be described, taking a case for example in which black-dot-like stains are growing rapidly after long use in a liquid crystal image display device which naturally displays white images (the stains could be white-dot-like etc. stains in black displaying mode or color displaying mode).

This defect mode occurs only when there is a minute pinhole 44 having a size of 1 $\mu$m or less on the insulating layer as shown in FIG. 9 which illustrates a cross section taken along line B—B of FIGS. 4 and 7. The insulating layer exists on the scan lines 11 abutting the liquid crystal 17 and is composed of the gate insulating layer 30 and the passivation insulating layer 37. Occurrence of such a pinhole is often caused by inclusion of minute foreign matters or particles during the formation of the insulating layer used for fabricating the active substrate 2 and impossible to be prevented with the current technology. It is also difficult to prevent occurrence of pinholes in a photosensitive resin during the photolithography process which is repeated several times. Dust generated particularly in the gate insulating layer is unavoidable because of the characteristics of the PCVD system, so that pinholes are likely to occur in the gate insulating layer.

Generally, the passivation insulating layer 37 is formed on the entire surface of the active substrate 2. Therefore, even if a pinhole of 1 $\mu$m or more is present in the gate insulating layer, it is covered with the passivation insulating layer 37 so that the scan lines 11 and the opposed electrodes 40 are not exposed. The resolution of photolithography for forming the opening 38 in the passivation insulating layer 37 is less than 1 $\mu$m so that there is virtually no fear of occurrence of pinholes having a size of 1 $\mu$m or less during the formation of the opening in the passivation insulating layer 37.

However, the ordinary passivation insulating layer made of SiNx is poor in coverage because it is formed at low temperature as described earlier. Therefore, if a pinhole of 1 $\mu$m or less is present in the gate insulating layer 30, a minute hole 44 is sometimes formed in the passivation insulating layer 37 as shown in FIG. 9. In this case, the scan lines 11 and the opposed electrodes 40 are partially exposed (It should be noted that if a pinhole of 1 $\mu$m or more has occurred in the gate insulating layer 30, the pinhole is filled up with the passivation insulating layer 37 so that the aforesaid defect mode will not occur).

As mentioned earlier, there is formed the alignment layer 20 having a thickness of about 0.1 $\mu$m on the opposed electrodes 14, and pinholes are likely to occur in this alignment layer since the opposed electrodes 14 have a large area. The scan lines 11 of the active liquid crystal panel are usually continuously supplied with a potential of 0 to minus (−) several volts so that a direct current potential is always applied between the scan lines 11 and the opposed electrodes 14 (an ordinary TN type liquid crystal panel) or 40 (an IPS type liquid crystal panel). This causes the liquid crystal in the vicinity of the pinhole 44 to be degraded by hydrolysis and as a result, the color of displayed images, which should be white, becomes brown and then black. This is the cause of the above-described defect mode.

In short, if a pinhole having a size of 1 lm or less is present in the gate insulating layer, the pinhole is not filled up with the passivation insulating layer so that it is impossible to prevent occurrence of defects.

The pinhole is minute, having a size of 1 $\mu$m or less, the liquid crystal does not degrade before several hours to several days are past even if it is heated to about 60° C., being in an accelerated condition. Therefore, when an aging inspection is made to check such a liquid crystal, there is imposed a serious burden. The aging inspection takes a long time particularly in the case of IPS mode liquid crystal panels because the opposed electrodes of the IPS mode have a smaller area, compared to those of TN mode liquid crystal panels so that current does not flow smoothly.

Even when a pinhole inspection is done with the most up-to-date automatic optical inspection system in the fabrication process in order to solve the above problem, the currently available resolving power is insufficient (the resolution prescribed by the specification is 1.5 $\mu$m). It can be easily imagined that even if a high resolving power optical inspection system was available, it would take more than several minutes to inspect one active substrate, and as a result, the inspection cost would be forced to increase tremendously.

As an effective measure for preventing occurrence of pinholes of 1 $\mu$m or less, there has been proposed a technique in which the passivation insulating layer is formed so as to be as thick as 1 $\mu$m and the pinholes are filled up with the passivation insulating layer per se. However, this leads to an increase in the cost of the passivation insulating layer formation process. Another conceivable attempt is such that the formation temperature of the passivation insulating layer is raised to about 300° C. to improve the coverage of the passivation insulating layer, but this also reveals a drawback. Concretely, where the semiconductor layer is a-Si, it has low heat resistance so that the mobility $\mu$ of electrons becomes lower, causing degradation of the electric characteristics of the insulated gate transistor. In consequence, difficulties arise in the application of lug the insulated gate transistor to large-screen or high precision liquid crystal panels.

For applying electrochemical treatment such as anodic oxidation to the substrate, the following process is needed: As shown in FIG. 10, the substrate 2 is immersed in a formation solution 51 in an insulated vessel 50, being hold in an upright condition. A direct current potential is then applied to a connection pattern 52 formed on the upper part of the substrate 2 through a connection jig such as clips, with the upper part of the substrate 2 being partly left above the surface of the solution. In FIG. 10, reference numerals 53, 54, 55 designate a direct current power source, an ammeter and a cathode plate composed of an SUS plate, respectively.

The above process has revealed the following problem. The size of the substrate, which is presently 550×650 mm, is expected to be 600×720 mm in the next generation and to further increase to 850×950 mm. If the substrate becomes larger, the height of the anodic oxidation system must exceed 3 m because of the increased size of the mechanism for vertically lifting and lowering the substrate. Therefore, a significant number of steps are needed for delivery and installation in a plant and in addition, this requires a clean room with a high ceiling, accompanied with the increased capacity of the clean room and therefore increased air conditioning cost. Also, treatment systems, which deal with chemical solutions, have a cost problem in the maintenance of the clean room, because there is a high possibility of generation of a large amount of chemical mist so that a large amount of air needs to be exhausted for the sake of security and hygiene.

As has been described above, it is difficult to cover the conductive pattern on the substrate with an insulating layer free from pinholes and such pinholes are likely to be the main cause of various defects particularly in the substrate of display devices.

In such circumstances, there have been long awaited the realization of a pinhole test method capable of detecting pinholes on scan lines, opposed electrodes and storage capacitance lines without conducting an aging inspection. For accomplishing the above and other objects, there have been strong demands to the development of a compact production system capable of applying electrochemical treatment to a particular region in a substrate, applying electrochemical treatment to a plurality of substrates at the same time, and dealing with larger substrates.

DISCLOSURE OF THE INVENTION

The present invention is directed to overcoming the foregoing problems and therefore provides a technique in which a specified chemical solution is applied to the top surface of a horizontally laid substrate; pinholes on an insulating layer are found by electrochemical means; and the pinholes which have been found are filled up with an insulating material different from that of the insulating layer. Concretely, the invention is designed as follows.

A first aspect of the invention describes a substrate comprising, on a conductive pattern, an insulating layer in which at least the lower part of pinholes are filled up with an insulating material different from the material of the insulating layer.

With this arrangement, the conductive pattern can be thoroughly covered with the insulating layer.

A second aspect of the invention describes a substrate for use in a display device, the substrate comprising, on a conductive pattern, an insulating layer in which pinholes are filled up with an insulating material different from the material of the insulating layer.

This makes it possible to easily realize an image display device free from defects.

A third aspect of the invention describes an in-substrate selective electrochemical treatment system comprising:

holding means such as a stage or mount for holding a treatment object, that is, an insulating substrate basically in a horizontal condition so as to be fixedly positioned;

an electrode electrically connected, in the periphery of the insulating substrate, to a conductive pattern formed on the insulating substrate, for applying a positive or negative potential of a constant value to the conductive pattern;

chemical solution confining means for confining a conductive chemical solution in only a specified region on the insulating substrate, the specified region being smaller than the insulating substrate or slightly larger than an image displaying section of an active substrate formed on the insulating substrate;

a reversed polarity electrode plate for applying a potential to the chemical solution, the potential having a constant value and being opposite to the potential of the conductive pattern in a negative/positive sense; and chemical solution supplying and discharging means for supplying and discharging the chemical solution to and from a specified position on the insulating substrate.

With this arrangement, electrochemical treatment such as pinhole inspection can be applied to a certain region on the substrate without use of a special mask material.

It is apparent that apart from the above components, there is provided a mechanism such as a laser range finder, differential transformer, and hydraulic cylinder, for measuring and adjusting the distance between the insulating substrate and the reversed electrode plate, in case of necessity.

The part or region on the insulating substrate within which the chemical solution is confined or kept is basically a pixel section and does not include the driving circuit section located around it. However, pixels are sometimes aligned in a row in the vicinity of the displaying section to be used in product inspection etc. and in this case, the chemical solution may be confined within the region where pixels are aligned in a row.

The distance between the pixel section and the driving circuit section is currently about 1 mm, but this may be changed in future. In addition, if the driving circuit section is not formed on the substrate before inspecting the pixel section or if the driving circuit section is protected by any means, the region where the driving circuit section is located or to be formed may be exposed to the chemical solution.

A fourth aspect of the invention describes an in-substrate selective electrochemical treatment system in which the reversed polarity electrode plate is smaller than the insulating substrate or slightly larger than the image displaying section of the active substrate formed on the insulating substrate, the system having means for confining the chemical solution by surface tension or a seal, to be kept in a gap created by making the reversed polarity electrode plate close to the treatment object, that is, the insulating substrate.

With this arrangement, the electrochemical treatment can be selectively applied to only the region on the substrate where the electrode plate is placed.

A fifth aspect of the invention describes an in-substrate selective electrochemical treatment system in which the reversed polarity electrode plate is a double-purpose reversed polarity electrode plate which (or more particularly, only a sponge (described later) attached thereto) is smaller than the insulating substrate or slightly larger than the image displaying section of the active substrate formed on the insulating substrate; which includes a porous soft material (thin) plate attached thereto such as a sponge whose inner surface facing the insulating substrate is impregnated with the chemical solution; and which is softly pressed against the insulating substrate.

With this arrangement, electrochemical treatment can be selectively applied to only the region on the substrate where the double-purpose reversed polarity electrode plate is softly pressed (or the region where the sponge or the like attached to the reversed polarity electrode plate is pressed).

A sixth aspect of the invention describes an in-substrate selective electrochemical treatment system in which the reversed polarity electrode plate is smaller than the insulating substrate or slightly larger than the image displaying section of the active substrate formed on the insulating substrate.

This treatment system includes a mechanism for pressing a frame-shaped container disposed on the insulating substrate. The frame-shaped container has, at the upper and lower ends thereof, an opening slightly larger than the reversed polarity electrode plate (the size of the openings is as large as possible on condition that no problem arises in insertion, attachment and detachment of the reversed polarity electrode plate relative to the frame-shaped container (e.g., about 0.1 mm to 0.3 mm)). The frame-shaped container has chemical resistance in the region around the opening at the lower end (the chemical resistant region includes the underside of the frame-shaped container). A flexible sealing material is embedded into the opening of the frame-shaped container so as to project downwardly from the frame like frame-shaped container.

With this arrangement, the chemical solution does not leak from the frame like frame-shaped container on the substrate and therefore excessive force is not imposed on the substrate. In addition, the electrochemical treatment can be selectively applied to the region where the frame like frame-shaped container is mounted.

A seventh aspect of the invention describes an in-substrate selective electrochemical treatment system which comprises a chemical solution confining section in the form of a box-shaped container having a reversed polarity electrode therein. The chemical solution confining section has, at its ends, an opening which is smaller than the insulating substrate or slightly larger than the image displaying section of the active substrate formed on the insulating substrate (these openings do not extend over other members already formed on the substrate), and a flexible sealing material is embedded into the lower open-end of the chemical solution confining section. The in-substrate selective electrochemical treatment system further comprises pressing means for pressing the chemical solution confining section against the insulating substrate.

With this arrangement, the electrochemical treatment can be selectively applied to the region where the box-shaped container is mounted on the substrate. In addition, generation of chemical solution mist can be restricted so that the chemical resistance of the electrochemical treatment system can be increased and the consumption of the chemical can be markedly reduced.

A eighth aspect of the invention describes an in-substrate selective electrochemical treatment system which has washing means for washing away a chemical solution remaining on a lower surface, wall surface and others within a chemical solution treatment space by use of a washing fluid such as pure water after completion of the treatment of the insulating substrate within the chemical solution treatment space. The chemical solution treatment space is created by pressing a frame like frame-shaped container against the insulating substrate. The frame like frame-shaped container has, at its upper and lower ends, an opening slightly larger than the reversed potential electrode plate and has a flexible sealing material embedded in the lower open-end.

With this arrangement, the chemical solution used for the electrochemical treatment can be washed away (carried away) by e.g., pure water in every treatment. Therefore, there is no fear of the diffusion of the chemical solution adhered to the insulating substrate, so that the electrochemical treatment system can be easily protected from corrosion.

A ninth aspect of the invention describes an in-substrate selective electrochemical treatment system in which the temperature of the electrode plate is controlled by flowing temperature-controlled water inside the reversed polarity electrode plate.

This prevents changes in the temperature of the chemical solution due to an electrochemical reaction, so that the stability of the reaction speed etc. of the electrochemical reaction can be improved.

A tenth aspect of the invention describes an in-substrate selective electrochemical treatment system comprising means for circulating the chemical solution and means for controlling the temperature of the chemical solution.

By virtue of this arrangement, changes in the temperature of the chemical solution due to an electrochemical reaction can be prevented, increasing the stability of the electrochemical reaction.

A 11th aspect of the invention describes a process for treating a substrate by use of the in-substrate selective electrochemical treatment system described in the third and the fifth aspect of the invention. According to this treatment process, an insulating substrate having a conductive pattern is held on a stage, and an electrode is connected to the conductive pattern at the periphery of the insulating substrate. A specified amount of chemical solution is supplied onto the insulating substrate so as to be confined. The reversed polarity electrode plate is made close to the insulating substrate so that the reversed polarity electrode plate comes in contact with the chemical solution on the insulating substrate. A direct current electric field is applied between the electrode connected to the conductive pattern and the reversed polarity electrode plate. Thus, a treatment such as anodic oxidation and pinhole inspection is done.

A 12th aspect of the invention describes a process for treating a substrate by use of the in-substrate selective electrochemical treatment system described in the seventh of the invention and others. According to this treatment process, an insulating substrate having a conductive pattern is held on a stage, and a chemical solution is supplied to a frame-shaped or box shaped container. An electrode is connected to the conductive pattern at the periphery of the insulating substrate. A direct current electric field is applied between the electrode and the reversed polarity electrode plate within the container. Thus, a treatment is done.

A 13th aspect of the invention describes a liquid crystal image display having an insulating substrate (the so-called active substrate) and a liquid crystal packed between the insulating substrate and a transparent insulating substrate or color filter (the so-called opposed substrate) opposed to the insulating substrate, the insulating substrate comprising, on one main surface,
a plurality of scan lines each composed of one or more metal layers (and common capacitance lines and/or opposed electrodes);
a plurality of signal lines each composed of one or more metal layers and (substantially) crossing the scan lines at right angles through one or more insulating layers;
an insulated gate transistor provided for every crossover point at which a scan line and a signal line cross each other; and
at least one pixel electrode connected to a drain of the insulated gate transistors;
wherein (at least the bottom of) a pinhole of the insulating layer formed on the scan lines (and the common capacitance lines and/or the opposed electrodes) except on the signal lines and drain lines is filled up with an insulating material.

This prevent the phenomenon in which a current flows from a scan line (and a common capacitance line and/or an opposed electrode) within the pinhole, causing degradation of the liquid crystal.

A 14th aspect of the invention describes a liquid crystal image display in which the scan lines (and the common capacitance lines and/or the opposed electrodes) are made from a metal that can be anodized and (at least the bottom of) the pinhole of the insulating layer is filled up with an anodic oxide of the metal.

With this arrangement, the inside of the pinhole is insulated with the anodic metal oxide (insulating material) so that a current is prevented from flowing from the scan line (and the common capacitance line and/or the opposed electrode) to the liquid crystal, causing degradation of the liquid crystal.

A 15th aspect of the invention describes a liquid crystal image display in which (at least the bottom of) a pinhole of the insulating layer formed on the scan lines (and the common capacitance lines and/or the opposed electrodes) is filled up with an organic insulating material by electrodeposition.

With this arrangement, the pinhole is filled up with an organic insulating material irrespective of the material of the scan lines so that the phenomenon in which a current flows from the scan line (and the common capacitance line and/or the opposed electrode) to the liquid crystal, causing degradation of the liquid crystal can be prevented.

A 16th aspect of the invention describes an inspection method for a liquid crystal image display having an insulating substrate (the so-called active substrate) and a liquid crystal packed between the insulating substrate and a transparent insulating substrate, color filter or reflector opposed to the insulating substrate, the insulating substrate comprising, on a main surface,
a plurality of scan lines each composed of one or more metal layers (and common capacitance lines and/or opposed electrodes);
a plurality of signal lines each composed of one or more metal layers and substantially crossing the scan lines at right angles through one or more insulating layers;
an insulated gate transistor provided for every crossover point at which a scan line and a signal line cross each other; and
at least one pixel electrode connected to a drain of the insulated gate transistors,
wherein an electrolytic solution is kept between the insulating substrate and an electrode plate and an electric field is applied between the scan lines (and the common capacitance lines and/or the opposed electrodes) and the electrode plate, thereby checking the presence or absence of a pinhole of an insulating layer formed on the scan lines (and the common capacitance lines and/or the opposed electrodes).

With this arrangement, a liquid crystal panel is formed and a pinhole on a scan line (and a common capacitance line and/or an opposed electrode), which is previously detectable only by an aging test, can be detected on the active substrate.

A 17th aspect of the invention describes a process for repairing an active substrate in a liquid crystal image display having an insulating substrate (the so-called active substrate) and a liquid crystal packed between the insulating substrate and a transparent insulating substrate or color filter opposed to the insulating substrate, the insulating substrate comprising, on one main surface,
at least a plurality of scan lines each composed of one or more metal layers (and common capacitance lines and/or an opposed electrodes);
a plurality of signal lines each composed of one or more metal layers and crossing the scan lines at right angles through one or more insulating layers;
an insulated gate transistor provided for every crossover point at which a scan line and a signal line cross each other; and
at least one pixel electrode connected to a drain of the insulated gate transistors,
wherein a chemical solution is kept between the insulating substrate and an electrode plate and an electric field is applied between the scan lines (and the common capacitance lines and/or the opposed electrodes) and the electrode plate, thereby electrically inactivating a scan line (and a common capacitance line and/or an opposed electrode) within a pinhole of the insulating layer formed on the scan lines (and the common capacitance lines and/or the opposed electrodes).

This arrangement can prevent the phenomenon in which a current flows from the scan line (and the common capacitance line and/or the opposed electrode) to the liquid crystal, thereby deteriorating the liquid crystal.

A 18th aspect of the invention describes a repairing process (perfecting method by repairing) associated with the active substrate repairing process of the 17th aspect of the invention, in which a formation solution is kept between the electrode plate and the active substrate having the scan lines (and the common capacitance lines and/or the opposed electrodes) made from a metal layer which can be anodized and an electric field is applied between the scan lines (and the common capacitance lines and/or the opposed electrodes) and the electrode plate, thereby anodizing the scan line (and the common capacitance line and/or the opposed electrode) within a pinhole of an insulating layer formed on the scan lines (and the common capacitance lines and/or the opposed electrodes).

With this arrangement, the scan line (and the common capacitance line or the opposed electrode) within the pinhole are anodized to make their surfaces be an insulating layer, thereby preventing the phenomenon in which a current flows from the scan line (and the common capacitance line and/or the opposed electrode) to the liquid crystal, causing degradation of the liquid crystal.

A 19th aspect of the invention describes a repairing process associated with the active substrate repairing process of the 17th aspect of the invention, in which an electrodeposition solution is kept between the active substrate and the electrode plate, and an electric field is applied between the scan lines (and the common capacitance lines and/or the opposed electrodes) and the electrode plate, thereby filling a pinhole of an insulating layer formed on the scan lines (and the common capacitance lines and/or the opposed electrodes) with an organic insulating material.

With this arrangement, the pinhole is filled up with an organic insulating material irrespective of the material of the scan lines (and the common capacitance lines and/or the opposed electrodes) so that the phenomenon, in which a current flows from the scan line (and the common capacitance line and/or the opposed electrode) to the liquid crystal, deteriorating the liquid crystal, will not occur.

A 20th aspect of the invention describes a repairing process associated with the active substrate repairing process of claim 7, in which an electrolytic solution is kept between the electrode plate and the active substrate having the scan lines (and the common capacitance lines and/or the opposed electrodes) to which an electrolytic process can be applied, and an electric field is applied between the scan lines (and the common capacitance lines and/or the opposed electrodes) and the electrode plate, thereby electrolytically corroding the scan line (and the common capacitance line and/or the opposed electrode) within a pinhole of an insulating layer formed on the scan lines (and the common capacitance lines and/or the opposed electrodes).

With this arrangement, the scan lines (and the common capacitance lines and/or the opposed electrodes) within the pinhole are electrolytically corroded and eliminated so that the phenomenon, in which a current flows from the scan line (and the common capacitance line or the opposed electrode) to the liquid crystal, deteriorating the liquid crystal, is unlikely to occur.

A 21st aspect of the invention describes an in-substrate selective chemical treatment system associated with the in-substrate selective chemical treatment system of the 7th aspect of the invention, which comprises a mechanism for supplying and discharging a chemical solution, pure water, drying gas or the like to and from a space defined by a box-shaped container and an insulating substrate.

With this arrangement, chemical treatment can be applied selectively to the region on the substrate where the box-shaped container is mounted. In addition, occurrence of chemical solution mist can be restricted so that the chemical resistance etc. of the chemical treatment system can be significantly improved.

A 22nd aspect of the invention describes a process for treating a substrate by use of an in-substrate selective chemical treatment system, the process being associated with the repairing process of the 17th aspect of the invention. According to this substrate treatment process, an insulating substrate is held on a stage and a box-shaped container is pressed against the insulating substrate. Then, a chemical solution is supplied to the box-shaped container for application of specified chemical treatment. After discharging the chemical solution, pure water or the like is supplied to the container to wash the inside of the box-shaped container and the insulating substrate. After the pure water has been discharged, warm drying gas is supplied to the box-shaped container to dry the inside of the box-shaped container and the insulating substrate.

With this arrangement, chemical treatment can be applied selectively to the region on the substrate where the box-shaped container is mounted. In addition, occurrence of chemical solution mist can be restricted so that the chemical resistance etc. of the equipment can be significantly improved.

BRIEF EXPLANATION OF THE DRAWINGS

FIG. 13 schematically illustrates a treatment performed by an electrochemical treatment system according to a third embodiment of the invention.

FIG. 14 schematically illustrates a treatment performed by an electrochemical treatment system according to a fourth embodiment of the invention.

FIG. 15 shows a sectional view of a scan line within a pinhole after anodic oxidation and a sectional view of a scan line within a pinhole after electrodeposition.

Figure 1:
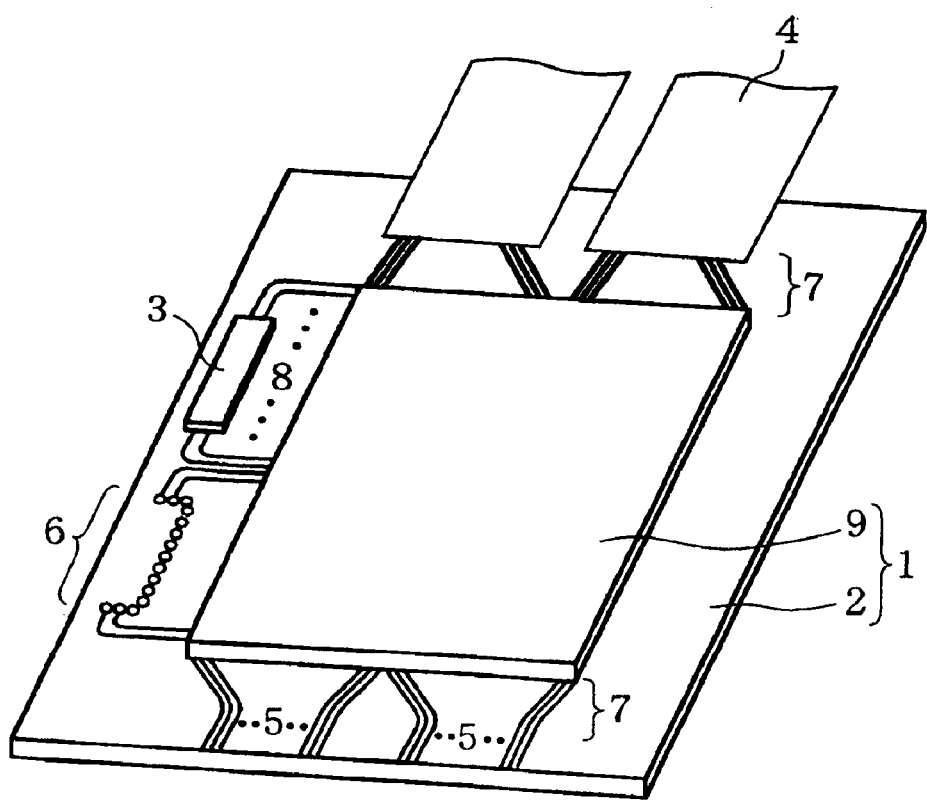
FIG. 1 is a perspective view showing a packaged condition of a liquid crystal panel.
Figure 2:
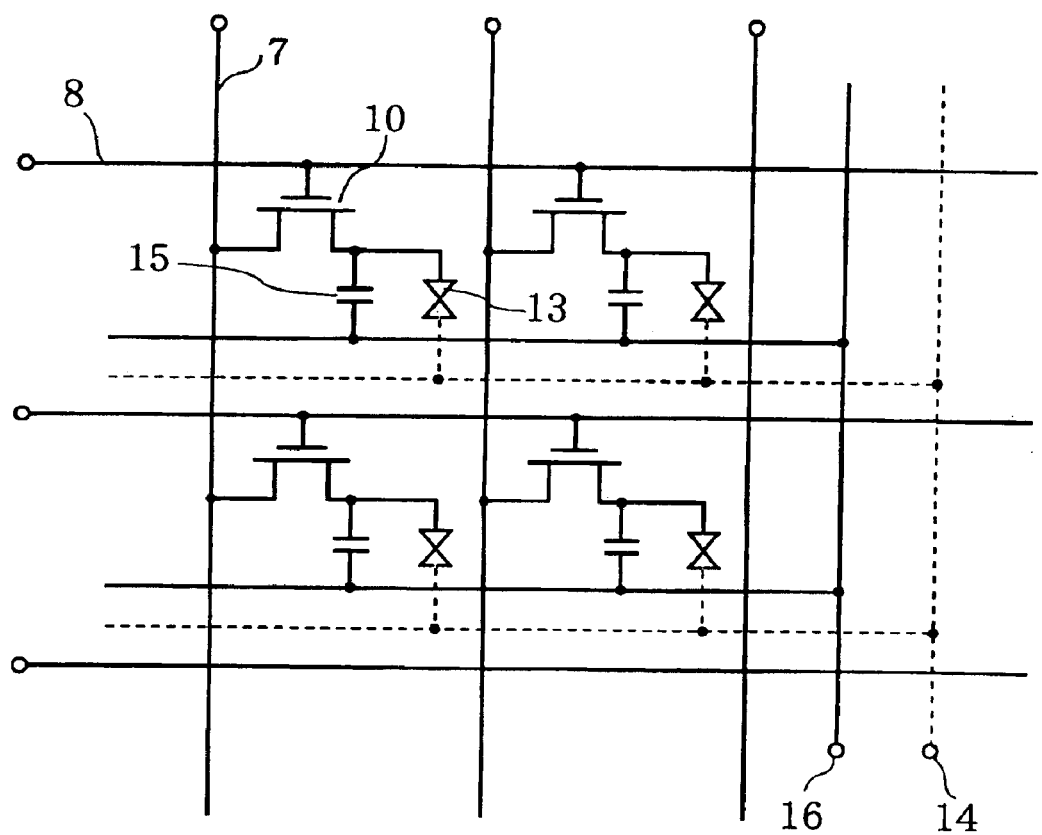
FIG. 2 is an equivalent circuit diagram of the liquid crystal panel.
Figure 3:
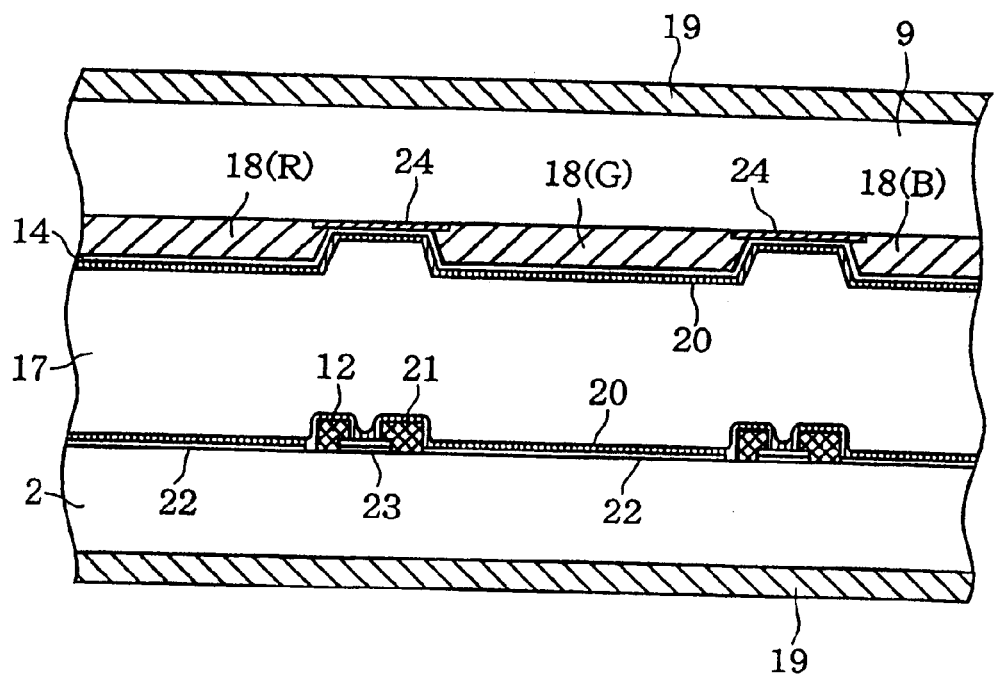
FIG. 3 is a sectional view of a widely used conventional liquid crystal panel.
Figure 4:
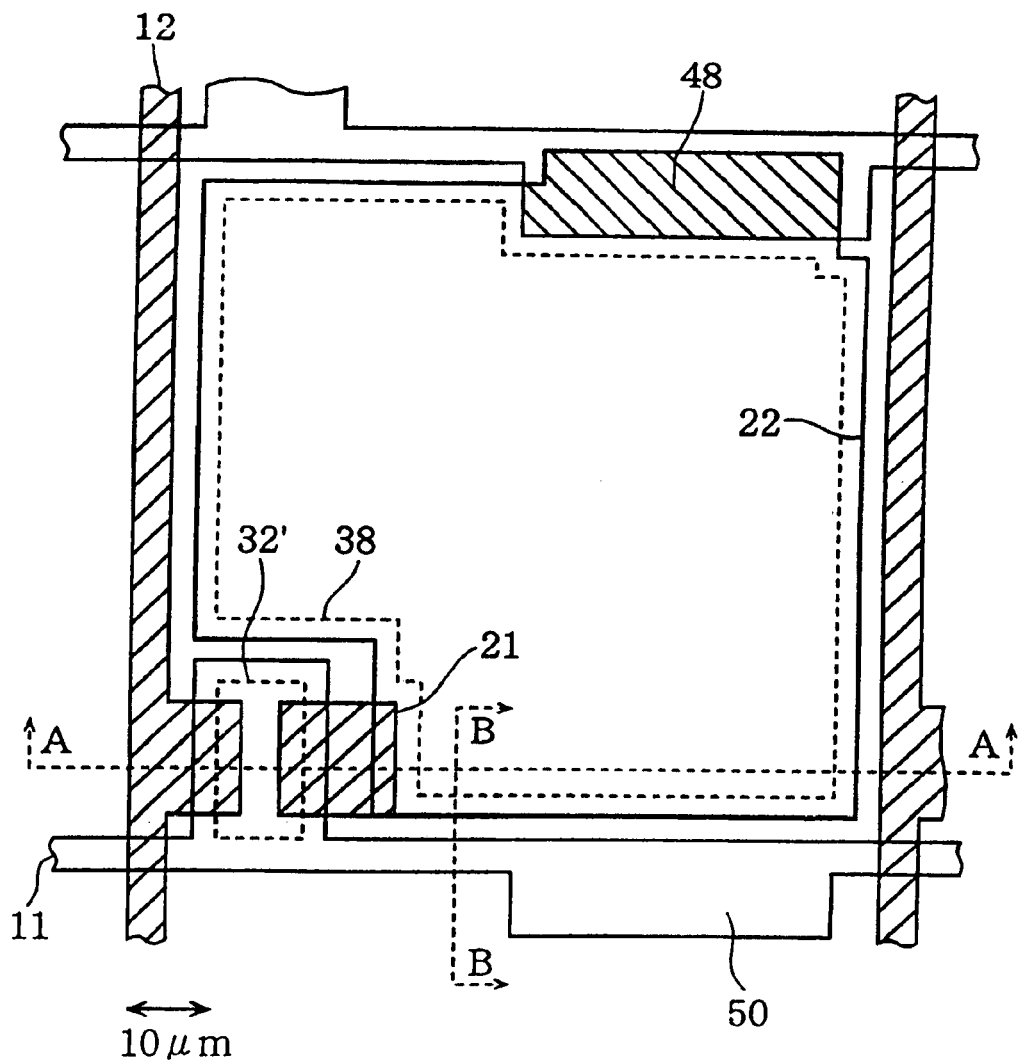
FIG. 4 is a plan view of a conventional active substrate.
Figure 5:
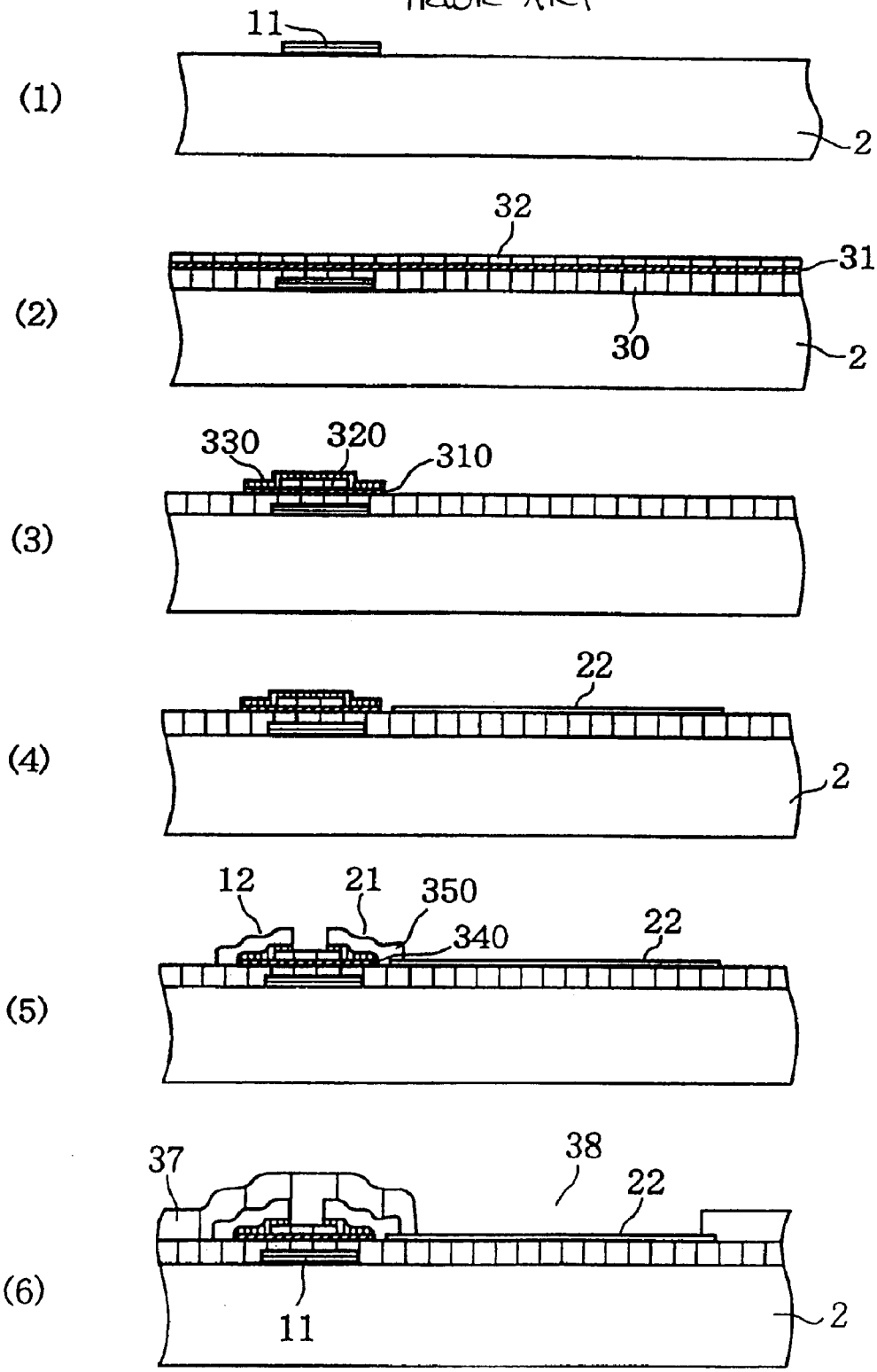
FIG. 5 is fabricating process diagrams each showing a section of the conventional active substrate.
Figure 6:
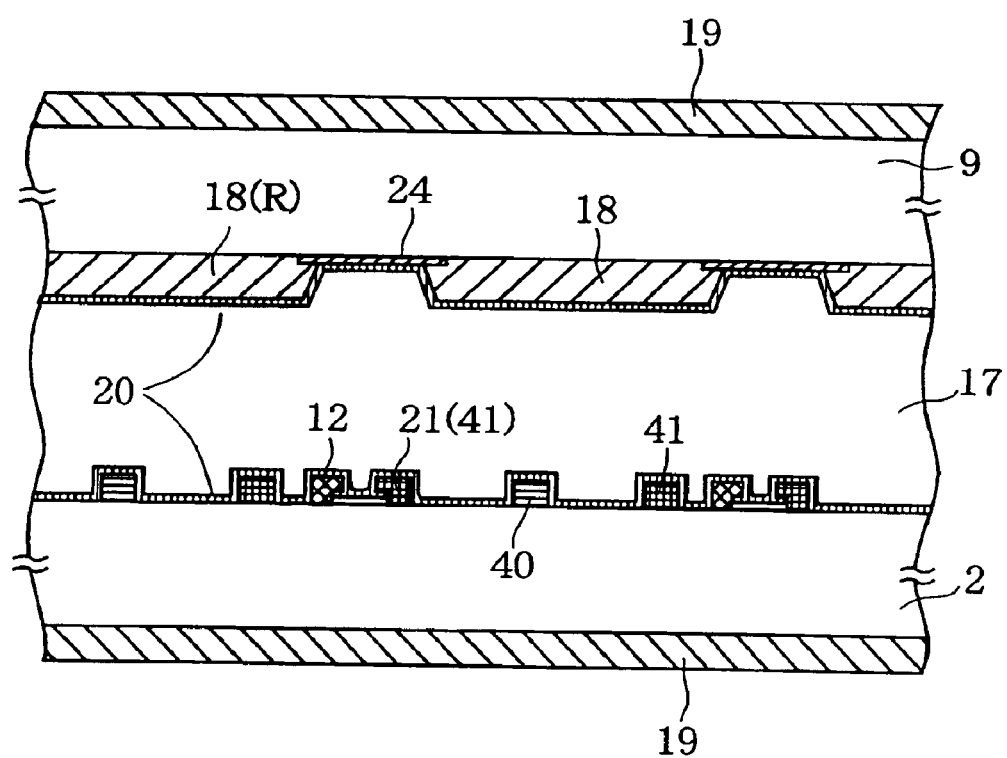
FIG. 6 is a sectional view of an IPS type liquid crystal panel.

| (Explanation of Reference Numerals) | |
|---|---|
| 1: | liquid crystal panel |
| 2: | active substrate (glass substrate) |
| 3: | semiconductor integrated circuit chip |
| 4: | TCP film |
| 5, 6: | terminal electrode |
| 7: | signal line (source wiring, source electrode) |
| 8: | scan line (gate) |
| 9: | color filter (opposed glass substrate) |
| 10: | insulated gate transistor |
| 16: | common capacitance line |
| 17: | liquid crystal |
| 19: | polarizing plate |
| 20: | alignment layer |
| 21: | drain electrode |
| 22: | (transparent conductive) pixel electrode |
| 24: | black matrix (BM) |
| 30: | gate insulating layer (first SiNx layer) |
| 31: | (first) amorphous silicon layer containing no impurities |
| 320: | etching stopper layer (second SiNx layer) |
| 330: | (second) amorphous silicon layer containing impurities |
| 340: | heat-resistant barrier metal layer (Ti) |
| 350: | low-resistance metal layer (AL) |
| 37: | passivation insulating layer |
| 38: | opening formed on the passivation insulating layer on the pixel electrode |
| 40: | (IPS liquid crystal panel's) opposed electrode |
| 41(21): | (IPS liquid crystal panel's) pixel electrode |
| 44: | pinhole |
| 50: | (insulated) chemical solution container |
| 51: | chemical solution (formation solution) |
| 53: | direct current power source |
| 55: | cathode (plate) |
| 60: | (substrate's) stage |
| 620: | sponge |
| 61: | electrode plate |
| 62: | chemical solution (sponge) |
| 69: | frame-shaped container |
| 70: | anodic oxidation layer (of scan line) |
| 71: | chipped pattern portion (of scan line) |
| 80: | box-shaped container |
| 81: | chemical solution (pure water) supply port |
| 82: | chemical solution (pure water) recovery port |

EMBODIMENT OF THE INVENTION

The invention will be hereinafter described according to its embodiments.

(First Embodiment)

Figure 11:
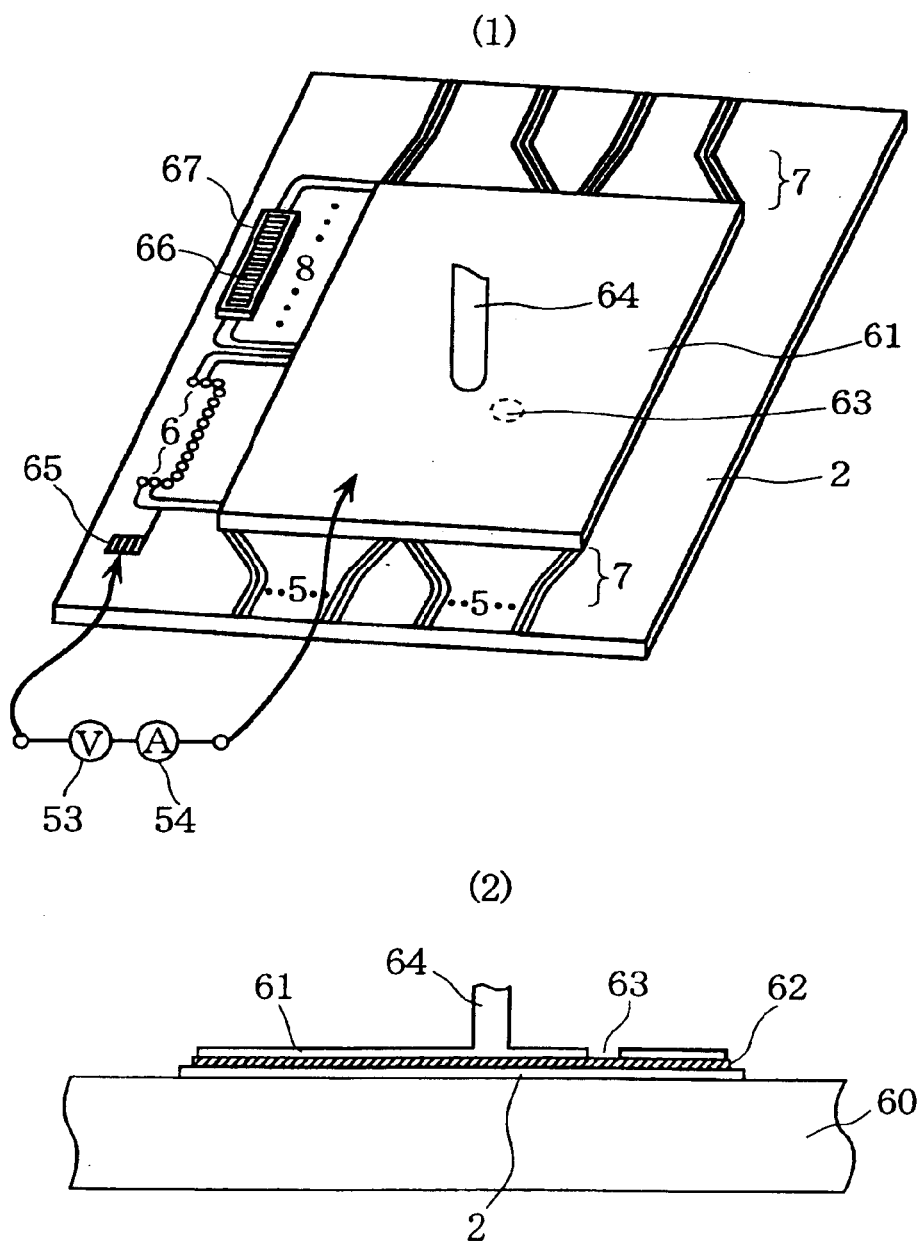
FIG. 11 schematically illustrates the structure of an electrochemical treatment system according to a first embodiment of the invention and a treatment performed by it.

A first embodiment of the invention will be described with particular reference to FIG. 11. In FIG. 11, parts and elements corresponding to those of the prior art explained earlier are indicated with the same reference numerals as in the prior art and there is omitted an explanation on them. This is equally applied to other figures and embodiments.

An active substrate 2 is conveyed from the outside of an in-substrate selective electrochemical treatment system or from a substrate storage container within the treatment system by a conveyor means (not shown) such as a robot arm to be installed and horizontally retained on a stage 60. There is a mechanism for holding the substrate 2 by use of vacuum suction. Then, an electrode plate 61 is made to be close to the active substrate 2 and an electrolytic solution 62 such as nitric acid adjusted for example 01 N (normal) is dropped onto a gap between the active substrate 2 and the electrode plate 61. For this purpose, an appropriate area of the electrode plate 61 is provided with a chemical solution injecting port 63. Theoretically, the smaller the gap between the active substrate and the electrode plate is, the smaller the amount of the chemical solution is required. However, the gap is set to 0.1 to 0.5 mm, in consideration of the fact that there are warpage and swell in the order of about 0.05 mm in the active substrate 2. With the gap of such an order, the electrolytic solution is trapped within the gap by surface tension so that it does not flow into the region where terminal electrodes 5, 6 are disposed and which is near an image displaying section.

Reference numeral 64 designates a supporting bar for holding, lifting and lowering the electrode plate 61. Specifically, the terminal electrodes 5, 6 are usually made of a metallic material that is used for forming signal lines 7 and scan lines 8 and exposed when they are incorporated in an active substrate. Therefore, pinhole inspection is conducted on only the image displaying section in order to avoid damage to the terminal electrodes 5, 6 caused by a useless chemical reaction with the electrolytic solution 62. The chemical strength of the electrolytic solution should be as small as possible. As described earlier, the components of the image displaying section other than the pixel electrode are covered with a passivation insulating layer 37 (in the case of IPS type liquid crystal panels, the image displaying section is entirely covered), and the scan lines 11 and the signal lines 12 do not react with the electrolytic solution 62 unless there are pinholes or chipped portions within the passivation insulating layer. Even if there is a pinhole or chipped portion within the passivation insulating layer, no voltage is applied between the scan lines 8 and the pixel electrode 22 or the signal lines 7, so that the presence of a pinhole or the like does not affect, in principle, a pinhole test conducted for inspecting the insulating layer on the scan lines 8.

A minus potential is applied from a direct current power source 53 to a terminal 65 that collects the scan lines 8 so as to be arranged in series or in parallel in the periphery of the active substrate 2, and a plus (+) potential is applied from the direct current power source to the electrode plate 61, while the value of a current flowing between the terminal 65 and the electrode plate 61 is measured by an ammeter 54. Since the range of the current measurement is $\mu$A or more, this measurement system does not need high accuracy and accordingly no difficulties will arise if the value of applied voltage is 10 V or less. No current flows unless there are chipped portions or pinholes in the insulating layer on the scan lines 8. If chipped portions or pinholes exist, a current proportional to the size and number of chipped portions or pinholes will flow, and therefore, the presence of pinholes can be easily detected. In this case, even if the diameter of the pinholes is as small as 1 $\mu$m or less, the potential difference per the distance between the scan lines etc. and the chemical solution becomes significant because the thickness of the insulating layer is small. In consequence, the chemical solution can easily penetrate into the pinholes.

There is no problem if the terminal 65 for collecting the scan lines 8 is replaced with a conductive metal plate 66. In this case, the conductive metal plate 66 is pressed against a group of terminals 6 of the scan lines 8 through an ACF 67 that is a conductive medium, similarly to the packaging process. In cases where not only the presence/absence of pinholes but also their distribution is measured, a leakage current may be measured from every scan line using a probe, without collecting all the scan lines 8 together to be brought into contact with the ammeter.

Figure 7:
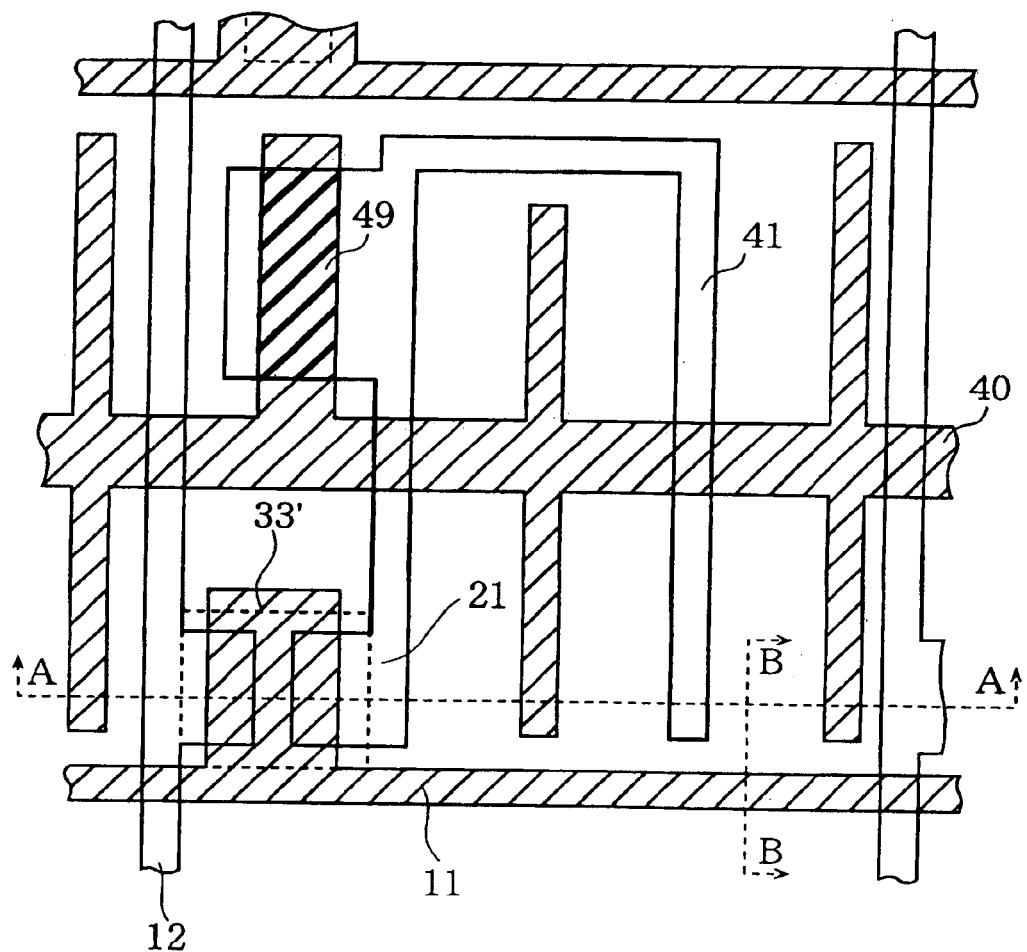
FIG. 7 is a plan view of an IPS type active substrate.
Figure 8:
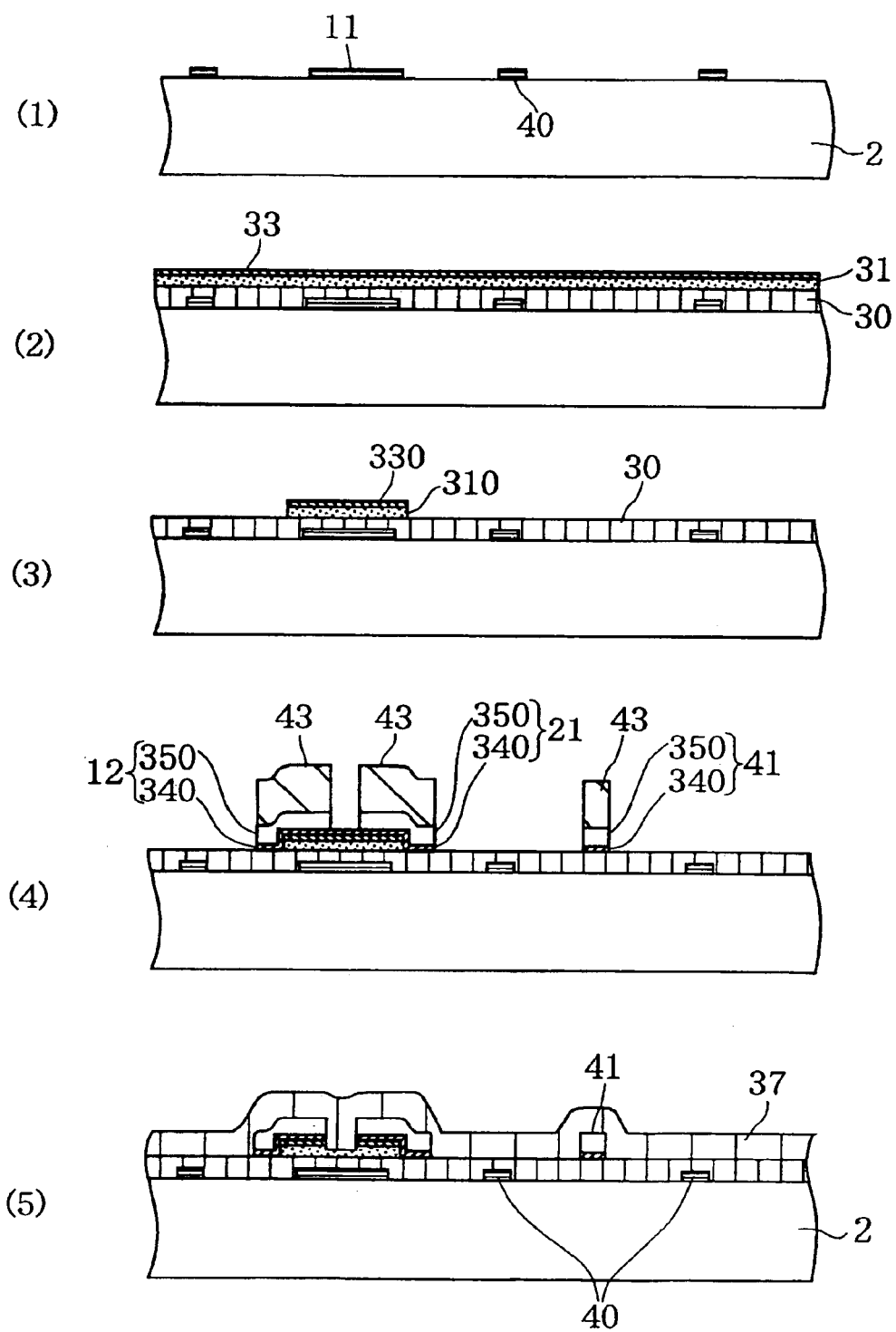
FIG. 8 shows how a section of the IPS type active substrate changes with the progress of its fabricating process.
Figure 9:
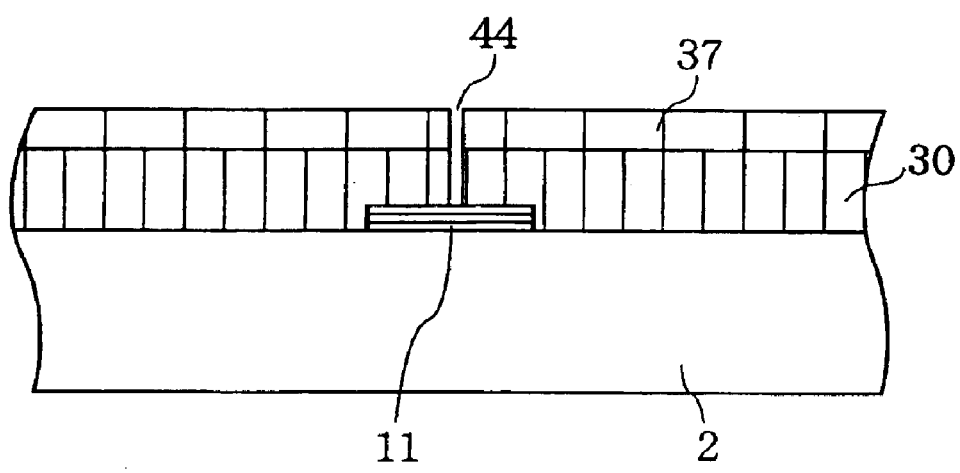
FIG. 9 shows a pinhole formed on an insulating layer on scan lines.
Figure 10:
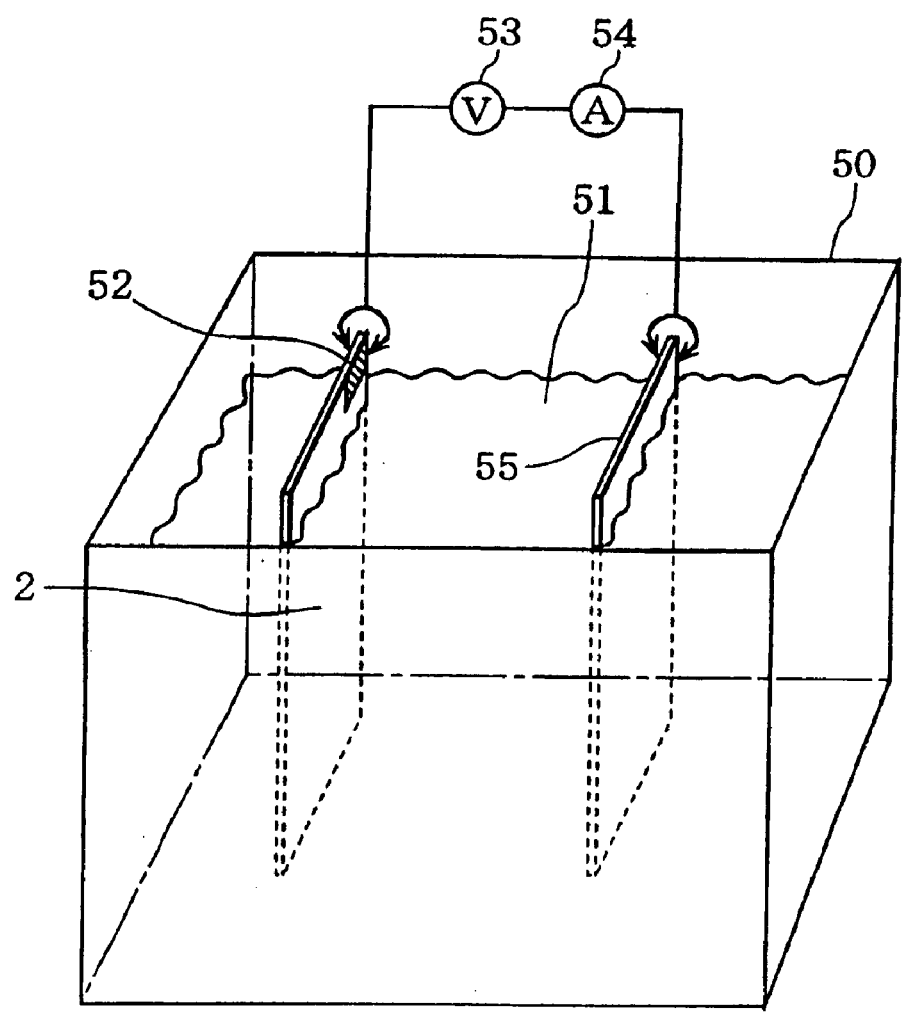
FIG. 10 schematically illustrates the structure of a conventional batch processing type anodic oxidation system.

In the IPS type liquid crystal panel, each of common capacitance lines 40 shown in FIGS. 7, 8 is not necessarily provided with an electrode terminal unlike scan lines 11. In many cases, since they are collectively connected in other regions than the image displaying section, pinholes on the opposed electrodes or the common capacitance lines 40 can be inspected by treating the node in the same manner as the terminal 65.

After completion of the pinhole inspection, the chemical solution on the surface is recovered by suction through an injection hole on the electrode plate 61 and then removed. Thereafter, the (reversed polarity) electrode plate 61 is moved away from the active substrate 2 while the active substrate being separated from the stage. After the remaining chemical solution is further washed away with pure water or the like, the active substrate is taken out of the chemical treatment system.

(Second Embodiment)

A second embodiment is designed such that a sponge impregnated with a chemical solution is adhered to the inner surface of the electrode plate.

Figure 12:
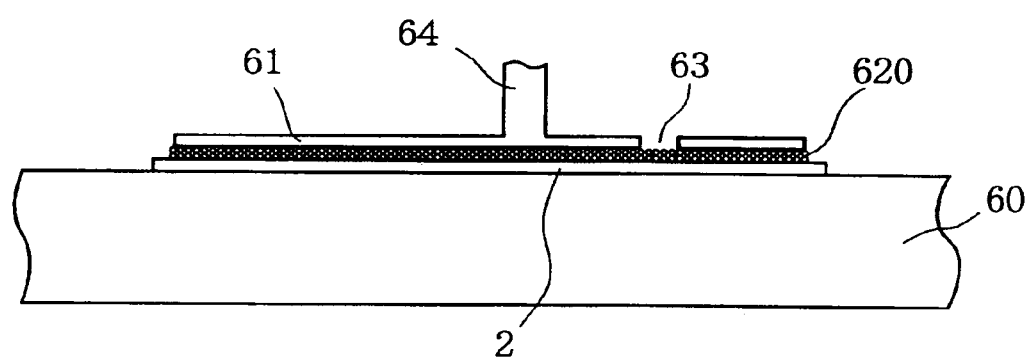
FIG. 12 schematically illustrates the structure of an electrochemical treatment system according to a second embodiment of the invention and a treatment performed by it.

In this embodiment, as shown in FIG. 12, a sponge 620 impregnated with a chemical solution is adhered to the inner surface of the electrode plate 61 opposed to the active substrate 2. The chemical solution is confined in a specified region by pressing the electrode plate 61 against the active substrate 2. After completion of the pin hole inspection, the electrode plate 61 is moved away from the active substrate 2 and the chemical solution adhered to the active substrate 2 is recovered and removed. Then, the active substrate 2 is separated from the stage, and taken out of the chemical treatment system after the chemical solution is further removed. It is apparent that the material of the sponge and the material of the member for adhering or fixing the sponge to the electrode plate 61 must be selected taking chemical resistance into account in relation to the chemical characteristics of the chemical solution.

In the second embodiment, the use of the sponge allows the chemical solution to be trapped within the sponge. The chemical solution is replenished upon request only when the chemical solution within the sponge decreases in amount, so that the amount of the chemical solution to be shifted onto the substrate can be reduced. In other words, this embodiment is advantageous in that the amount of the chemical solution to be taken away being adhered to the substrate 2 or the consumption of the chemical solution (i.e., the loss of the chemical solution) can be reduced and in that a voltage as high as 100 V or more can be easily applied during the electrochemical treatment, by letting the sponge have a thickness of several mm or more.

It is possible to use a stereotyped, general-purpose electrode plate, while only the sponge needs to be designed to have the same shape and size as those of the inspection region of the active substrate.

Further, a plurality of sponges may be adhered to the electrode plate.

(Third Embodiment)

A third embodiment uses a frame-shaped container.

Reference is made to FIG. 13 for describing the third embodiment of the invention.

First, the active substrate 2 is placed on the stage 60 to be held horizontally there on. Then, a frame-shaped container 69 is pressed against the active substrate 2, the frame-shaped container 69 having an opening slightly larger than the electrode plate 61 at its upper and lower ends and a sealing material 68 embedded at its lower end. Then, the electrode plate 61 is inserted into the frame-shaped container 69 and held in a stationary condition at a position several mm or more apart from the active substrate 2. Subsequently, an appropriate electrolytic solution 62 such as nitric acid 0.1 N is dropped into the frame-shaped container 69. Note that reference numeral 64 designates a supporting bar for holding, lifting and lowering the electrode plate 61. A mechanism for holding, lifting and lowering the frame-shaped container 69 is simple and unrelated to the object of the invention and therefore an explanation of the mechanism is omitted in the drawings.

A minus potential is applied from a direct current power source to the terminal 65 in the periphery of the active substrate 2, and a plus potential is applied from the direct current power source to the electrode plate 61, while the value of a current flowing between the terminal 65 and the electrode plate 61 is measured. Although not shown in the drawings, the electrolytic solution 62 is exhausted from the frame-shaped container 69 with a proper means after completion of the pinhole inspection and then, pure water is introduced into the frame-shaped container 69 and discharged therefrom thereby removing the electrolytic solution 62. Thereafter, the substrate 2 is preferably dried with a proper means and then, the electrode plate 61 and the frame-shaped container 69 are moved away from the substrate 2. Subsequently, the substrate 2 is separated from the stage 60 to be taken out of the chemical treatment system.

In the third embodiment, use of the frame-shaped container 69 allows the electrolytic solution 62 to be trapped within the frame-shaped container 69. Therefore, the electrolytic solution can be recovered and removed without dispersion and scatter on the substrate. In addition, since the electrode plate can be moved far away from the active substrate, a voltage as high as 100 V or more can be easily applied during the electrochemical treatment.

(Fourth Embodiment)

A fourth embodiment utilizes a box-shaped container.

In the present embodiment, a specialized treatment container is used for the purpose of preventing diffusion and scatter of the chemical solution itself. A box-shaped container 80 used in the present embodiment is the same as the container of the forgoing third embodiment except use of a lid. Specifically, the container 80 uses a flexible sealing material 68 embedded in its open end.

With reference to FIG. 14, the fourth embodiment will be described below.

First, the active substrate 2 is placed and horizontally held on the stage 60 as shown in FIGS. 14(1) and 14(2). Then, as shown in FIG. 14(2), the box-shaped container 80 is pressed against the active substrate 2. The box-shaped container 80 has (i) the electrode plate 61 mounted therein, (ii) an opening slightly larger than the image displaying section and defined at the lower end of the electrode plate 61, and (iii) the flexible sealing material 68 embedded at the lover and. Then, the proper electrolytic solution 62 such as nitric acid 0.1 N is supplied to the box-shaped container 80 through a chemical solution supply port 81 while being recovered from a chemical solution discharge port 82, thereby carrying out a circulative supply. Note that the electrode plate 61 is fixedly placed within the box-shaped container 69. A minus potential is applied from a direct current power source to the terminal (not shown) and a plus potential is applied from the direct current power source to the electrode plate 61, whereby an electrochemical treatment is done. After completion of the electrochemical treatment, discharge of the electrolytic solution, washing-away of the electrolytic solution with pure water, and drying of the inside of the box-shaped container 80 as well as the substrate by spraying drying gas are carried out. Then, the box-shaped container 80 is separated from the substrate 2 and subsequently, the substrate 2 is separated from the stage 60 to be taken out of the electrochemical treatment system.

As shown in FIG. 14(1), a piping system for circulating the electrolytic solution 62 is formed as a closed circuit by connecting a supply pipe 83, the box like box-shaped container 80 and an electrolytic solution recovery pipe 82, the supply pipe 83 having an electrolytic solution supply tank 85 and an electrolytic solution supply pump 86. Reference numeral 87 represents a filter for removing particles and impurities contained in the electrolytic solution, whereas reference numeral 88 represents a temperature controlling system such as a cooler for controlling the temperature of the circulating electrolytic solution 62. In addition, pure water supplied from a pure water supply port 101 and an inactive gas such as nitrogen gas supplied from a drying gas supply port 102 are sent to the box-shaped container 80 by switching selector valves 91, 92. Similarly, the electrolytic solution 62 recovered from the chemical solution recovery port 82, treating water discharged after washing the inside of the box-shaped container 69, and a treating gas which has been used for drying the inside of the box-shaped container 69 are sent to either the chemical solution circulating tank 85 or a drain (and exhaust) port 103, by operation of selector valves 93, 94 in combination.

According to the fourth embodiment, there is absolutely no fear of generation of the electrolytic solution and electrolytic solution mist around the substrate 2, so that the electrochemical treatment system of this embodiment assures extremely high safety. When conducting a pinhole inspection on the scan lines 11 (and the opposed electrodes and/or the common capacitance lines 40), a rise in the temperature of the electrolytic solution 62 due to leakage current is insignificant and therefore the circulation of the electrolytic solution 62 is unnecessary. In this case, it is preferable to stop the circulation pump 86 because the noise of the leakage current can be reduced and, in consequence, a desirable result can be achieved.

(Fifth Embodiment)

The fifth embodiment relates to repair of a matrix substrate by use of the electrochemical treatment system described above, in cases where a pinhole is present in the insulating layer on the scan lines (and the opposed electrodes and/or the storage capacitance lines).

As explained in the fabrication process of the active substrate 2, various metallic materials can be used for the scan lines. In cases where a scan line material such as Ta, Al and their silicides, which forms an insulating layer by anodic oxidation, is used, the electrochemical treatment system described earlier in the explanation of the embodiments is employed; a formation solution such as oxalic acid and ethylene glycol is selected as the chemical solution; and a plus potential is applied to the scan lines 11 while a minus potential is applied to the electrode plate 61 made from high-purity SUS or SUS plate 61 coated with precious metal, whereby the scan line 11 within the pin hole 44 is anodized, forming a Ta or Al anodized layer 70 to fill part of the pinhole 44 as shown in FIG. 15(1). In this case, formation voltage is 100 to 200 volts and the thickness of the anodized layer 70 is 0.2 to 0.5 As so that sufficient withstand voltage can be ensured.

(Sixth Embodiment)

The invention is associated with a technique of filling a pinhole with an organic insulating material. Even though a pinhole is filled with an organic insulating material, there is no problem as far as insulating characteristics necessary for devices can be attained. In view of this fact, a solution containing about 0.01% polyamic acid salt is selected as an electrodeposition solution from materials that enable formation by electrodeposition, as described in "T IEE Japan" (Vol. 112, No. 12, 1992) and a plus potential is applied to the scan lines 11 while a minus potential being applied to the electrode plate 61, whereby the pinhole 44 can be filled up with a polyimide layer 71 as shown in FIG. 15(2). With an electrodeposition voltage of about 10V, the thickness of the polyimide layer 71 can be easily made to be 1 $\mu$m. After precipitation of the polyimide layer 71, it is preferable to increase the insulating characteristics of the polyimide layer 71 by applying heat treatment at 200 to 300° C. for several to several tens of minutes. Heating conditions may be experimentally determined as they are dependent on the heat resistance of the insulated gate transistors and the composition of the material of the liquid crystal. The repairing method of this embodiment has the advantage that any materials can be used for the scan lines (and the opposed electrodes and/or the common capacitance lines).

(Seventh Embodiment)

Figure 16:
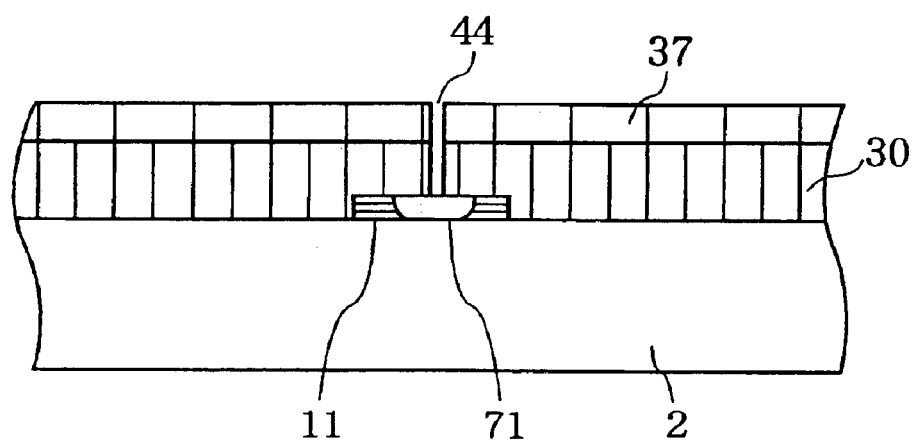
FIG. 16 is a sectional view of a scan line within a pinhole after electrolytic treatment.

The seventh embodiment relates to a technique of discontinuing the scan line in a pinhole area. In cases where a scan line material such as Cr, Mo and Ti that enables electrolytic treatment by a chemical solution is used in contrast with the foregoing two embodiments, the electrochemical treatment system of the invention is used; an electrolytic solution such as nitric acid or hydrochloric acid about 0.1 N is used as the chemical solution 62; and a plus potential is applied to the scan lines 11 while a minus potential being applied to the electrode plate 61 composed of a SUS plate, whereby a scan line in the pinhole 44 is dissolved into the electrolytic solution 62 in the form of positive Cr, Mo and Ti ions, so that Cr, Mo and Ti thin films are precipitated on the surface of the electrode plate 61. The electrolytic treatment is continued for an appropriate period of time, namely, several minutes to ten-odd minutes to dissolve the scan line 11 within the pinhole 44 by about several $\mu$m, thereby forming a chipped portion 71 as shown in FIG. 16. Although it depends on the pattern width of the scan line 11, the scan line 11 in the region where a pinhole is present may be removed in the form of the pinhole for line discontinuation. In this case, as far as a redundancy arrangement or remedy circuit is provided, the active substrate can be easily restored to its sound condition.

Usually, 10 to 50 V is enough for bath voltage. By virtue of the elimination of the scan line 11 within the pinhole 44, even if the liquid crystal penetrating through the pinhole electrically reacts with the remaining scan lines 11, it takes a time for the ions generated by the electrochemical reaction to pass through the narrow space having a height of 0.3 $\mu$m (which corresponds to the thickness of the scan line 11) at the highest. As a result, appearance of abnormalities in displayed images can be delayed. This leads to improved reliability.

(Eighth Embodiment)

The eighth embodiment relates to cooling of the system.

In the above-described method for repairing a matrix substrate in which a pinhole is present in the insulating layer on the scan lines (and the opposed electrodes and/or the storage capacitance lines), a rise in the temperature of the chemical solution by formation current or bath current is insignificant like the case of the inspection method for checking the presence/absence of a pinhole on the insulating layer on the scan lines (and on the opposed electrode or the storage capacitance lines), and therefore circulation of the electrolytic solution is unnecessary.

However, the temperature of the chemical solution sometimes rises significantly during electrochemical treatment by use of the in-substrate selective electrochemical treatment system. For instance, when anodizing the scan lines made of an aluminum alloy in the process of fabricating four 15-type XGA panels on a 550×600 mm glass substrate, a formation current of 1 to 2A flows for several minutes with a formation voltage of 100 to 150 V in the case of constant voltage formation and therefore the temperature rise of the electrolytic solution is inevitable. The temperature rise of the electrolytic solution should be avoided by a proper means. If the amount of the confined electrolytic solution is small, temperature-controlled water may be allowed to flow inside the electrode plate to control the temperature of the electrode plate.

On the other hand, if the amount of the confined electrolytic solution is large, it is rational to control the temperature of the electrolytic solution by circulating it.

The in-substrate selective chemical treatment system of the present embodiment is obtained by expanding the concept of the above-described in-substrate selective electrochemical treatment system and comprises, as shown in FIG. 14, (i) the stage 60 for holding the insulating substrate; (ii) the mechanism for pressing the box-shaped container 80 against a region smaller than the insulating substrate 2 or slightly larger than the active substrate formed on the insulating substrate, the box like box-shaped container 80 having the flexible sealing material 68 embedded in an open end that is smaller than the above region; and (iii) the mechanism for supplying and discharging a chemical solution, pure water or drying gas into or from the box-shaped container 80.

The system of the eighth embodiment differs from the above-described in-substrate selective electrochemical treatment system in the following three points: First, the eighth embodiment does not need a direct current power source nor an electrode plate; second, the eighth embodiment does not need a means nor mechanism for electrically connecting a direct current power source to the scan lines and electrode lines such as signal lines; and lastly, the size of the opening of the box-shaped container is smaller than the insulating substrate or slightly larger than the active substrate formed on the insulating substrate. The treatment process for chemically treating the active substrate by use of such an in-substrate selective electrochemical treatment system is as follows.

First, the insulating substrate 2 is held on the stage 60 and the box-shaped container 80 is pressed against the insulating substrate 2. While the chemical solution 62 being supplied into the box-shaped container 80 through the chemical solution supply port 81, the chemical solution 62 is recovered through the chemical solution recovery port 82 thereby circulating the chemical solution 62 to carry out a chemical treatment for a specified period of time. After the supply of the chemical solution 62 has been stopped and the chemical solution 62 has been discharged through a discharge hole (not shown) defined in the lower part of the box-shaped container 80 utilizing pressure (and nitrogen gas), pure water is supplied to the inside of the box-shaped container 80 to wash the box-shaped container 80 as well as the insulating substrate 2. After discharging the washing water from the box-shaped container 80 by use of nitrogen gas, warm nitrogen gas is introduced into the box-shaped container 80 to dry the box-shaped container 80 and the insulating substrate 2. After completion of the chemical treatment on the insulating substrate 2, the supply of the dry gas is stopped, the box-shaped container 80 is moved away from the insulating substrate 2, and the insulating substrate 2 is separated from the stage 60 to be stored in the substrate storage within the chemical treatment system or taken out of the chemical treatment system. Apart from the method of purging the chemical solution and the washing water from the box-shaped container 80 by use of nitrogen gas, there is an alternative method for recovering the chemical solution and the washing water after completion of the chemical treatment, according to which the stage 60 is inclined to allow the chemical solution or the washing water to flow from the inside of the box-shaped container 80 into the recovery port 82. This alternative method is suitably applied particularly to the case of one side packaging and where this method is applied, it apparently becomes necessary to arrange the mechanism for pressing the box-shaped container 80 in compliance with the method.

(Other Embodiments)

Figure 17:
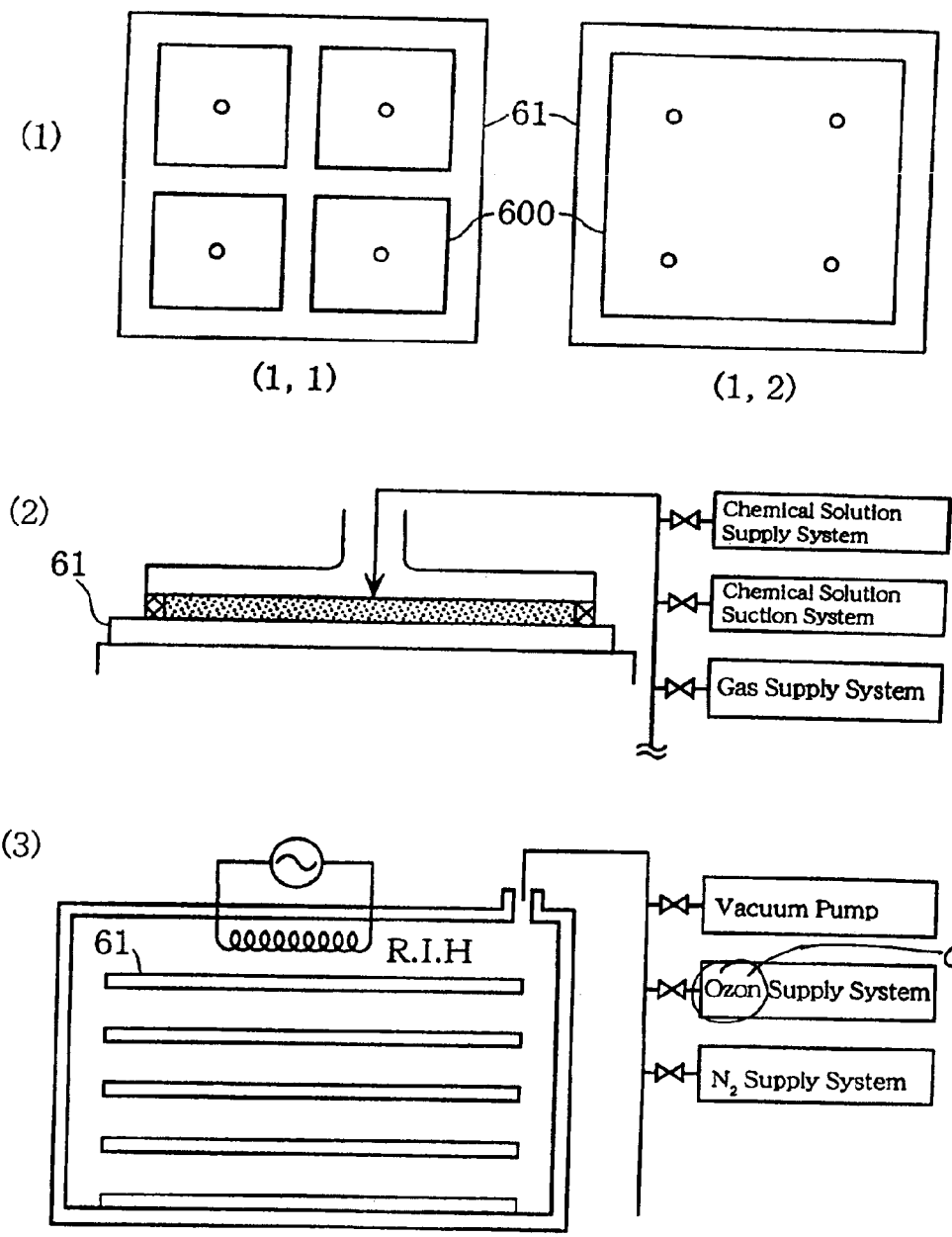
FIG. 17 schematically illustrates treatments performed by electrochemical treatment systems according to other embodiments of the invention.

FIG. 17 shows some of other embodiments of the invention.

FIG. 17(1) shows a case where a sponge 600 is adhered to the regular-sized electrode plate 61, the sponge being formed so as to be fitted to the shape and size of the substrate, that is, the measurement object. (1.1) is a case where a plurality of comparatively small substrates are inspected at the same time whereas (1.2) is a case where only one comparatively large substrate is inspected.

FIG. 17(2) shows an inspection system in which a chemical solution supplying section, a chemical solution suction section and a light pressure gas delivering section are connected to the electrode plate, for conducting an accurate and rapid pinhole inspection on a substrate.

FIG. 17(3) illustrates a case where heating (H) is carried out with infrared rays (IR) to raise temperature to about 250° C. and in this condition, oxidized gas such as ozone is delivered to a signal line made of iron, molybdenum or tungsten within a pinhole to insulate it by oxidation. In this case, a group of electrode terminals of each substrate is, of course, protected by a cover or the like. This embodiment is applicable to quantity production of various kinds of devices, because many substrates of various kinds can be simultaneously repaired. Use of covers for protecting the respective substrates does not matter in view of cost particularly in the case of quantity production and may bring about considerable cost reduction, depending on pinhole incidences.

Although the invention has been described according to several embodiments, it is obvious that the invention is not limited to them but may be modified in various ways. One modification will be explained below.

(1) While one active substrate is formed from one glass substrate in the case shown in FIG. 11, a number of active substrates may be formed from one substrate. For instance, four 15-type active substrates may be arranged on e.g., a 550×650 mm glass plate as shown in FIG. 13. With this arrangement, chemical treatment can be applied to the active substrates one by one or applied to the four active substrates at the same time.

(2) Substrates having an insulating layer on a conductive pattern, especially for use in display devices are not for the liquid crystal image display devices explained in the description of the embodiments of the invention but for matrix type image display devices such as PDPs (Plasma Display Panel) and organic ELs.

(3) Reflective type display devices.

(4) Strictly speaking, the box-shaped container has not a box-shaped shape nor rectangular parallelepiped shape, but may be pointed at its top.

INDUSTRIAL APPLICABILITY

It will be understood from the foregoing description that according to the in-substrate selective electrochemical treatment system of the invention, electrochemical treatment can be selectively applied to certain regions on a substrate without entirely immersing the substrate into a chemical solution. Therefore, the electrochemical treatment system may be of the compact type that simultaneously deals with a plurality of substrates. Such a type does not involve a large substrate which leads to excessive burdens in terms of the design and maintenance of a clean room. In addition, generation of chemical solution mist and vapor can be thoroughly prevented.

Further, unlike the conventional chemical treatment systems, the chemical treatment system of the invention does not require exhausting so that the lifetime of the treatment system can be highly improved, resulting in obviation of the need for maintenance cost. Further, it is favorable in view of safety.

In addition, the electrochemical treatment system of the invention can detect, on an active substrate basis, the presence or absence of a pinhole on the insulating layer on the scan lines (and the storage capacitance lines and/or the opposed electrodes) formed on the active substrate. Therefore, spot-like stains attributable to pinholes, which could not be detected previously unless a long-time aging test was conducted on the substrate assembled into a liquid crystal panel, can be found at an early stage, so that not only the cost of loss can be markedly reduced but also equipment cost and maintenance cost incurred by an aging test can be saved.

Furthermore, in cases where the scan line within a pinhole on the insulating layer formed on the active substrate is activated using the electric chemical electrochemical treatment system of the invention, there is no possibility of generation of the spot-like stains attributable to pinholes and in consequence, improvements in the yield and quality of the products can be achieved.

What is claimed is:

1. An in-substrate selective electrochemical treatment system for finding and repairing pinholes in an active substrate comprising:

holding means for holding an insulating substrate;

an electrode for connection at a periphery of an insulating substrate being held by the holding means, to a conductive pattern located on such an insulating substrate, said electrode being covered with an insulating layer;

chemical solution confining means for confining a chemical solution to only a specified region on an insulating substrate, the specified region being smaller than an insulating substrate or slightly larger than an image displaying section on an active substrate formed on an insulating substrate;

a reversed polarity electrode plate for applying an electric charge to the chemical solution, the electric charge having polarity opposite to an electric charge of said electrode;

chemical solution supplying and discharging means for supplying and discharging the chemical solution to and from an insulating substrate; and means for detecting at least one pinhole in said insulating layer comprising means for measuring the value of a current flowing between said electrode and said reversed polarity electrode plates.

2. An in-substrate selective electrochemical treatment system according to claim 1, wherein the reversed polarity electrode plate comprises a double-purpose reversed polarity electrode plate having a specified size and shape smaller than an insulating substrate slightly larger than the image displaying section of an active substrate formed on an insulating substrate, the double-purpose reversed polarity electrode plate also comprising the chemical solution confining means for confining the chemical solution in a gap obtained by locating the double-purpose reversed polarity electrode plate close to an insulating substrates.

3. An in-substrate selective electrochemical treatment system according to claim 2, further comprising electrode plate temperature controlling means for controlling the temperature of the reversed polarity electrode plate by flowing temperature-controlling liquid within the reversed polarity electrode plate.

4. An in-substrate selective electrochemical treatment system according to claim 1, wherein the reversed polarity electrode plate is a double-purpose reversed polarity electrode plate, which is smaller than an insulating substrate, or slightly larger than the image displaying section of an active substrate formed on an insulating substrate, and which also comprises the chemical solution confining means further comprising a porous soft material plate having a surface facing an insulating substrate and impregnated with the chemical solutions.

5. An in-substrate selective electrochemical treatment system according to claim 1, wherein the reversed polarity electrode plate has a specified size and shape smaller than an insulating substrate or slightly larger than the image displaying section of an active substrate formed on an insulating substrate; and wherein the chemical solution confining means comprises a frame-shaped container chemical solution confining means which has, at upper and lower ends thereof, an opening slightly larger than the reversed polarity electrode plate having the specified size and shape and comprises a frame-shaped container in which a flexible sealing material is attached to an area around the opening at the lower end;

the treatment system further comprising pressing means for pressing the frame-shaped container chemical solution confining means against an insulating substrate, with the reverse polarity electrode plate being located within the frame-shaped container chemical solution confining means.

6. An in-substrate selective electrochemical treatment system according to claim 5, further comprising washing means for washing, with a washing liquid, the chemical solution away from a chemical solution treatment space after completion of inspection, the chemical solution treatment space comprising the frame-shaped container chemical solution confining means pressed against an insulating substrate.

7. An in-substrate selective electrochemical treatment system according to claim 5, further comprising:

chemical solution circulating means for circulating the chemical solution within the chemical solution treatment space defined by the frame-shaped container chemical solution confining means or the frame-shaped container chemical solution confining means pressed against an insulating substrate; and chemical solution temperature controlling means for controlling the temperature of the chemical solution.

8. An in-substrate selective electric chemical treatment system according to claim 1, wherein the chemical solution confining means is a frame-shaped container chemical solution confining means for retaining the reversed polarity electrode plate therein and comprises a frame-shaped container having a flexible sealing material embedded in an open end thereof that is smaller than an insulating substrate slightly larger than the image displaying section of an active substrate formed on an insulating substrate;

the treatment system further comprising pressing means for pressing the frame-shaped container chemical solution confining means against an insulating substrate through the sealing member.

9. An in-substrate selective electrochemical treatment system according to claim 8, further comprising fluid supply and discharge means for supplying and discharging at least one of a chemical solution, washing liquid and drying gas to and from the frame-shaped container.

10. An electrochemical treatment process for treating a substrate by use of an in-substrate selective electrochemical treatment system for finding and repairing pinholes of an active substrate, comprising holding means for holding an insulating substrate; an electrode for connection at a periphery of an insulating substrate being held by the holding means, to a conductive pattern located on such an insulating substrate, said electrode being covered with an insulating layer; chemical solution confining means for confining a chemical solution to only a specified region, the specified region being smaller than an insulating substrate or slightly larger than an image displaying section on an active substrate formed on an insulating substrate; a reversed polarity electrode plate for applying an electric charge to the chemical solution, the electric charge having polarity opposite to an electric charge of said electrode; and chemical solution supplying and discharging means for supplying and discharging the chemical solution to and from an insulating substrate, the treatment process comprising:

holding an insulating substrate having a conductive pattern on the holding means;

supplying a predetermined amount of a specified chemical solution to a specified region on an insulating substrate and confining the solution to the specified region;

locating the reversed polarity electrode plate close to an insulating substrate such that the reversed polarity electrode plate comes in contact with the chemical solution which is on an upper surface of an insulating substrate;

bringing the electrode into contact with a conductive pattern in the periphery of an insulating substrate;

applying a specified direct current between said electrode and said reversed polarity electrode plate; and measuring the value of a current flowing between said electrode and said reversed polarity electrode plate for detecting at least one pinhole in said insulating layer.

11. An electrochemical treatment process for treating a substrate by use of an in-substrate selective electrochemical treatment system for finding and repairing pinholes of an active substrate, comprising holding means for holding an insulating substrate; an electrode for connection at a periphery of an insulating substrate being held by the holding means, to a conductive pattern located on such an insulating substrate, said electrode being covered with an insulating layer; a reversed polarity electrode plate having a specified size and shape smaller than an insulating substrate or slightly larger than an image displaying section on an active substrate formed on an insulating substrate; container chemical solution confining means comprising a frame-shaped container having, at a lower end or upper and lower ends thereof, an opening slightly larger than such a reversed polarity electrode plate and having a flexible sealing material attached to an area around the opening at the lower end; and pressing means for pressing the container chemical solution confining means against an insulating substrate, with the reversed polarity electrode plate being stored in the container chemical solution confining means, the treatment process comprising:

holding an insulating substrate having a conductive pattern on the holding means;

supplying a specified chemical solution to a space defined by the container chemical solution confining means and an insulating substrate;

connecting the electrode to the conductive pattern in the periphery of an insulating substrate;

applying a specified direct current between the electrode and the reversed polarity electrode plate; and measuring the value of a current flowing between said electrode and said reversed polarity electrode plate for detecting at least one pinhole in said insulating layer.

* * * * *

UNITED STATES PATENT AND TRADEMARK OFFICE
CERTIFICATE OF CORRECTION

PATENT NO. : 6,843,904 B1
DATED : January 18, 2005
INVENTOR(S) : Kiyohiro Kawasaki It is certified that error appears in the above-identified patent and that said Letters Patent is hereby corrected as shown below:

<u>Column 25,</u>
Line 14, change "plates." to -- plate. --.
Line 11, change "solutions." to -- solution. --.
Lines 12-13, change "substrates." to -- substrate. --.

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,843,904 B1
APPLICATION NO. : 09/868577
DATED : January 18, 2005
INVENTOR(S) : Kiyohiro Kawasaki It is certified that error appears in the above-identified patent and that said Letters Patent is hereby corrected as shown below:

Column 25,
Line 14, change "plates." to -- plate --.
Line 44, change "solutions." to -- solution. --.
Lines 26-27, change "substrates." to -- substrate. --.

This certificate supersedes Certificate of Correction issued June 14, 2005.

Signed and Sealed this

Fourth Day of July, 2006

JON W. DUDAS
*Director of the United States Patent and Trademark Office*